(12) United States Patent
Lysemose et al.

(10) Patent No.: US 12,494,694 B2
(45) Date of Patent: Dec. 9, 2025

(54) MODULAR CONSTRUCTION SYSTEM MOTOR UNIT

(71) Applicant: LEGO A/S, Billund (DK)

(72) Inventors: Joachim Panduro Lysemose, Billund (DK); Jørn Skovløber Hansen, Billund (DK)

(73) Assignee: LEGO A/S, Billund (DK)

( * ) Notice: Subject to any disclaimer, the term of this patent is extended or adjusted under 35 U.S.C. 154(b) by 181 days.

(21) Appl. No.: 18/551,998

(22) PCT Filed: Mar. 24, 2022

(86) PCT No.: PCT/EP2022/057796
§ 371 (c)(1),
(2) Date: Sep. 22, 2023

(87) PCT Pub. No.: WO2022/200513
PCT Pub. Date: Sep. 29, 2022

(65) Prior Publication Data
US 2024/0171041 A1    May 23, 2024

(30) Foreign Application Priority Data
Mar. 25, 2021   (DK) .............................. PA202170133

(51) Int. Cl.
*H02K 7/14* (2006.01)
*H02K 7/116* (2006.01)

(52) U.S. Cl.
CPC .............. *H02K 7/14* (2013.01); *H02K 7/116* (2013.01); *H02K 2213/03* (2013.01); *H02K 2213/12* (2013.01)

(58) Field of Classification Search
CPC ............................. A63H 33/042; A63H 33/086
See application file for complete search history.

(56) References Cited

U.S. PATENT DOCUMENTS

| | | |
|---|---|---|
| 5,411,428 A | 5/1995 | Orii et al. |
| 5,638,499 A | 6/1997 | O'Connor et al. |

(Continued)

FOREIGN PATENT DOCUMENTS

| | | |
|---|---|---|
| DE | 19543284 A1 | 5/1997 |
| JP | 2013065100 | 4/2013 |

(Continued)

OTHER PUBLICATIONS

Hakura, Ziyad S. et al., "Realistic Reflections and Refractions on Graphics Hardware With Hybrid Rendering and Layered Environment Maps", Eurographics, EGSR 2001: Rendering Techniques 2001, pp. 289-300.

(Continued)

*Primary Examiner* — Oluseye Iwarere
*Assistant Examiner* — Masoud Vaziri
(74) *Attorney, Agent, or Firm* — Day Pitney LLP; George Chaclas; Anthony A. Kassas

(57) ABSTRACT

A construction system motor unit comprising a casing, an electrical motor mounted therein, a power outtake element having a connector, and being rotationally connected relative to said casing, a gearing mechanism provided between the electrical motor and the power outtake element, and a sensor to sense the position of the power outtake element relative to the casing, the sensor having a disc element and a sensor device, the disc element is connected to the power outtake element or to a gear of the gearing mechanism via a first rotation transfer part and a receptacle for receiving the first rotation transfer part, which receptacle is formed in the power outtake element or in said gear of the gear mechanism, and wherein the receptacle and the first rotation transfer part have cooperating shapes and sizes configured to allow a backlash between the power outtake element and the first rotation transfer part.

15 Claims, 11 Drawing Sheets

(56) References Cited

U.S. PATENT DOCUMENTS

| | | |
|---|---|---|
| 5,687,610 A | 11/1997 | Poulsen et al. |
| 5,779,515 A | 7/1998 | Chung |
| 7,012,604 B1 | 3/2006 | Christie et al. |
| 8,525,826 B2 | 9/2013 | Nutter et al. |
| 2002/0190984 A1 | 12/2002 | Seiler et al. |
| 2004/0236539 A1 | 11/2004 | Clark et al. |
| 2006/0136180 A1 | 6/2006 | Hansen et al. |
| 2008/0074420 A1 | 3/2008 | Kuesel et al. |
| 2008/0224575 A1 | 9/2008 | Taya |
| 2009/0295805 A1 | 12/2009 | Ha et al. |
| 2010/0311300 A1* | 12/2010 | Hansen ................ A63H 33/042 446/91 |
| 2012/0150154 A1 | 6/2012 | Brisson et al. |
| 2012/0280993 A1 | 11/2012 | Jakobsen et al. |
| 2013/0069970 A1 | 3/2013 | Sasaki et al. |
| 2015/0245593 A1 | 9/2015 | O'Mara et al. |
| 2017/0314639 A1 | 11/2017 | Maienschein et al. |
| 2020/0179818 A1* | 6/2020 | Ma ...................... A63H 33/042 |
| 2022/0023767 A1* | 1/2022 | Gaba ................... A63H 30/02 |
| 2022/0118376 A1* | 4/2022 | Donaldson ............. B25J 9/08 |

FOREIGN PATENT DOCUMENTS

| | | |
|---|---|---|
| KR | 20070026820 | 3/2007 |
| KR | 20090125272 | 12/2009 |
| KR | 20090125545 | 12/2009 |
| KR | 20120083893 | 7/2012 |
| KR | 101954824 | 3/2019 |
| WO | 2011039041 | 4/2011 |
| WO | 2013164585 A1 | 11/2013 |
| WO | 2017144505 A1 | 8/2017 |
| WO | 2018158357 A2 | 9/2018 |
| WO | 2020121189 A1 | 6/2020 |
| WO | 2020156720 A1 | 8/2020 |
| WO | 2021009044 | 1/2021 |

OTHER PUBLICATIONS

KR Notice of Final Rejection corresponding to Application No. 10-2019-0085396, dated Sep. 30, 2021, 10 pages (with English translation).

International Search Report and Written Opinion corresponding to Application No. PCT/EP2022/057796, dated Jul. 15, 2022, 10 pages.

DK Office Action with Search Report corresponding to Application No. PA 2021 70133, dated Nov. 2, 2021, 7 pages.

Lee, Seung-Mok et al., "Split-and-Merge-Based Genetic Algorithm (SM-GA) for LEGO Brick Sculpture Optimization", IEEE Access, vol. 6, Aug. 15, 2018, pp. 40429-40438.

Luo, Sheng-Jie et al., "Legalization—Optimizing LEGO Designs", ACM Transactions on Graphics, vol. 34, No. 6, Article 22, Nov. 2015, 12 pages.

Weblog: "From making to introducing my Lego creation—essential websites and softwares", Apr. 20, 2017 JRL: https://apparat.tistory.com/46.

Website: "Program for making model instructions stored in an LDD (an LXF file)", Blueprint, Apr. 18, 2015 JRL: https://www.brickinside.com/newview.php?Db=CAD&Number=1458.

* cited by examiner

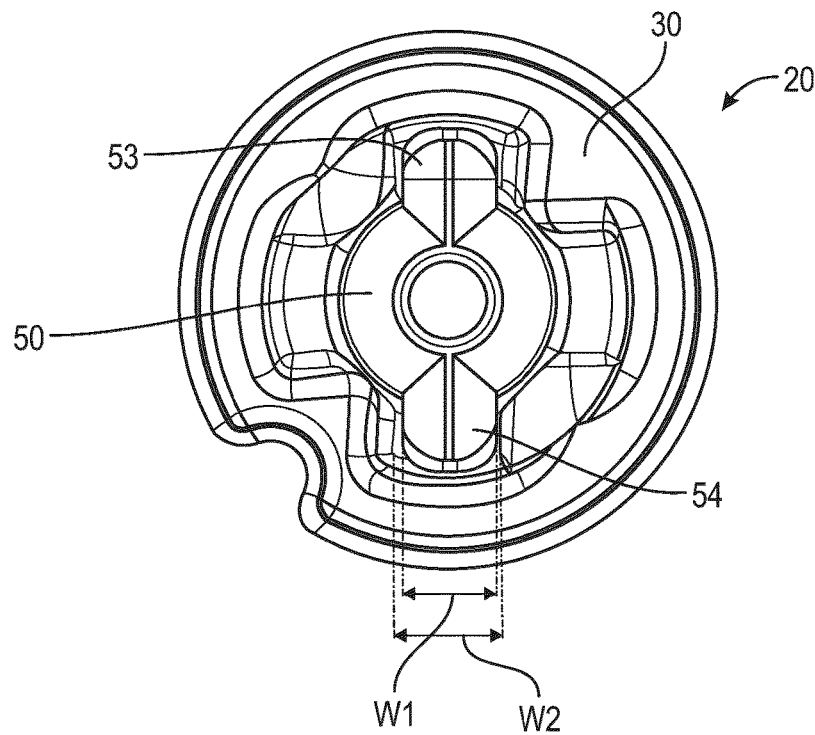
FIG. 7A
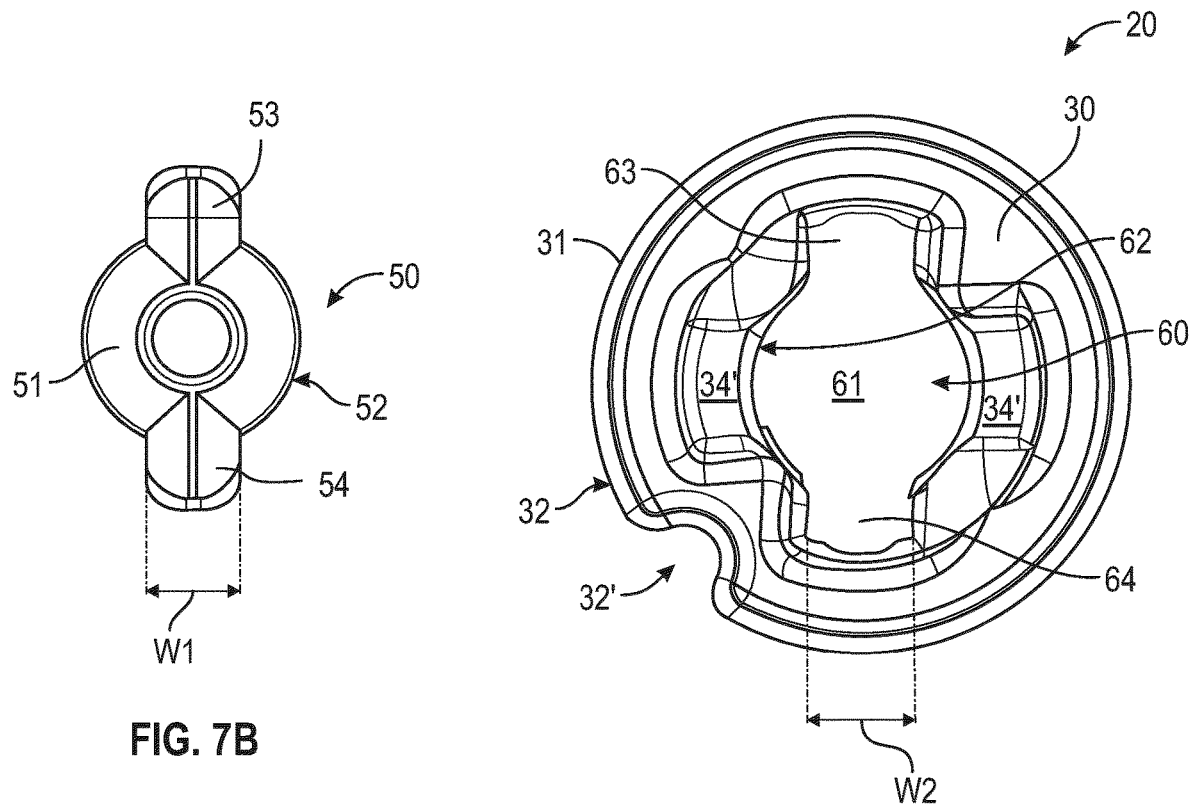
FIG. 7B
FIG. 7C

MODULAR CONSTRUCTION SYSTEM MOTOR UNIT

CROSS-REFERENCE

The present application is a U.S. National Stage Application of International Application No. PCT/EP2022/057796, filed on Mar. 24, 2022 and published on Sep. 29, 2022 as WO 2022/200513 A1, which claims the benefit and priority of Danish Patent Application No. 202170133, filed on Mar. 25, 2021, each of which is incorporated herein by reference in its entirety for any purpose whatsoever.

FIELD OF THE DISCLOSURE

The present disclosure relates to a modular construction system and a modular construction system motor unit.

BACKGROUND

Modular construction systems as such are known in the art, as is modular construction system motor units, or simple motor units, for such modular construction systems. Modular construction systems comprises a plurality of construction elements, for example building blocks or bricks, which—when connected together—may be assembled to form a variety of different building structures. Motor units may be added to such modular construction systems in order to make parts of such system move.

Modular construction systems are "modular" in the sense that the construction elements making up the construction systems are sized and shaped and comprise cooperating connection means allowing their interconnection, such that models/sets, such as figures robots, etc. may be constructed.

Learning systems, robotics construction sets, and so-called maker kits are known, which can provide a user with a variety of functionalities.

Modular construction elements as they are known from traditional modular construction systems, such as beams, plates, bricks, pegs, connectors, cog-wheels, etc., may be combined with functional modular construction elements, such as lighting elements, motors/actuators, sensors, but also programmable processor units, which may also be digitally connectable with external devices, e.g. for programming or remote control. Such modular construction systems with enhanced functionality have proven their value in a play and/or learning context, not the least because they facilitate reliable, yet easily detachable mechanical connections between simple and functional modular construction elements, and because the functional modular construction elements are adapted to each other to provide a positive and stimulating user experience.

A motor unit for such a modular construction system often comprises a power outtake disc comprising connection means suitable for connecting for example an axle or the like.

In many of the modular construction set applications, where functional construction elements such as motor units are applied, it is desirable to be able to control precisely the movement of the constructed set. For this purpose, the motor unit of a modular construction system may comprise an encoder, such as a magnet sensor with 360-degree resolution a regulated absolute position motor with 0-point indicator (zero-point indicator).

In modular construction systems the motor units often comprises a casing and other parts, such as a gear mechanism, comprising parts formed in plastic, in order to keep cost low, and they may thereby be easily connectable to other construction elements also formed in plastic. The motor units of the modular construction systems are often quite small, but still may be used in construction of quite large structures. Therefore, during use, a large—and sometimes asymmetric—load, may be applied to an outtake disc of the motor unit.

It has turned out to be a problem, when such asymmetric loads are applied to the motor unit. Sometimes the asymmetric load on the outtake element provides an asymmetry to the encoder, thereby causing the encoder to provide an incorrect measurement of the rotational position of the outtake element relative to the motor unit casing, and thereby compromising a precise control of the rotation.

There is therefore a need for a modular construction system motor unit having a reliable, precise rotation sensing mechanism also, when asymmetric loads are applied to the power takeout element of the motor unit.

SUMMARY

It is therefore an object of the disclosure to alleviate the problems of the prior art.

This is achieved by a modular construction system motor unit for a modular construction system, the motor unit comprising
 a casing;
 an electrical motor mounted in the casing;
 a power outtake element having at least one connector for connecting to a construction element, and being rotationally connected relative to said casing about a rotational axis;
 a gearing mechanism provided between the electrical motor and the power outtake element; and
 a rotation sensing mechanism configured for sensing the rotational position of the power outtake element relative to the casing,
 wherein the rotation sensing mechanism comprises
 a disc element configured for rotating with the power outtake element; and
 a sensor device being fixed relative to the casing,
 wherein the disc element is connected to the power outtake element or to a gear of the gear mechanism via a first rotation transfer part, the first rotation transfer part being fixedly connected relative to the disc element,
 wherein a receptacle configured for receiving the first rotation transfer part is formed in the power outtake element or in said gear of the gear mechanism, and
 wherein the receptacle and the first rotation transfer part have cooperating shapes and sizes configured to allow a backlash between the power outtake element and the first rotation transfer part.

In mechanical engineering, backlash, sometimes called lash or play, is a clearance or lost motion in a mechanism caused by gaps between parts. Thus, the cooperating shapes and sizes of the receptacle and the first rotation transfer part are configured such that a clearance, i.e. a gap is provided between them. The backlash allows a slight rotation of the power outtake element before the first rotation transfer part is engaged for rotation with the outtake element.

The gearing mechanism is configured for transferring rotation from the electrical motor to the power outtake element. The gearing mechanism is provided within the casing. The rotation sensing mechanism is provided within the casing.

In an embodiment, the cooperating shapes and sizes of the receptacle and the first rotation transfer part are configured such that the receptacle is allowed to rotate 0.5-2° before the first rotation transfer part is engaged for rotation with the outtake element.

In an embodiment, the disc element is connected to the power outtake element via a first axle.

In an embodiment, the disc element is arranged at a sidewall of the casing opposite to the power outtake element relative to the casing.

In an embodiment, some of the gears of the gear mechanism are coaxially arranged surround by and supporting the first axle.

In an embodiment, the first rotation transfer part comprises a cylindrical main body part and a first arm protruding therefrom, and where the receptacle comprises a cylindrical main trough and a first trough arm extending therefrom.

The first arm of the first rotation transfer part preferably extends perpendicular to a cylindrical outer surface of the first rotation transfer part. Correspondingly, the first trough arm of the receptacle preferably extends perpendicular to a cylindrical inner surface of the receptacle.

It will be appreciated that in preferred embodiment, the first arm of the first rotation transfer part extends perpendicular to the rotational axis of the outtake element. Correspondingly, the first trough arm of the receptacle preferably extends perpendicular to the rotational axis of the outtake element.

In an embodiment, the first arm of the first rotation transfer part has a first width, and the first trough arm of the receptacle has a second width, wherein the first width is 1-2 mm smaller than the second width.

In a second aspect the objects of the disclosure are obtained by a modular construction system comprising a modular construction system motor unit according to any one of the embodiments of the first aspect of the disclosure, and a plurality of construction elements.

It should be emphasized that the term "comprises/comprising/comprised of" when used in this specification is taken to specify the presence of stated features, integers, steps or components but does not preclude the presence or addition of one or more other features, integers, steps, components or groups thereof.

BRIEF DESCRIPTION OF THE DRAWINGS

Various aspects of the present disclosure are discussed herein with reference to the accompanying Figures. It will be appreciated that for simplicity and clarity of illustration, elements shown in the drawings have not necessarily been drawn accurately or to scale. For example, the dimensions of some of the elements can be exaggerated relative to other elements for clarity or several physical components can be included in one functional block or element.

Further, where considered appropriate, reference numerals can be repeated among the drawings to indicate corresponding or analogous elements. For purposes of clarity, however, not every component can be labeled in every drawing. The Figures are provided for the purposes of illustration and explanation and are not intended as a definition of the limits of the disclosure.

FIG. 7A, in a top view, shows an inner power outtake element of the power outtake element of FIG. 6, and its connection to a first rotation transfer part.

FIG. 7B, in a top view, shows the first rotation transfer part of FIG. 7A.

FIG. 7C, in a top view, shows the inner power outtake element of FIG. 7A, when not connected to the first rotation transfer part of FIG. 7B.

DETAILED DESCRIPTION

Figure 1A:
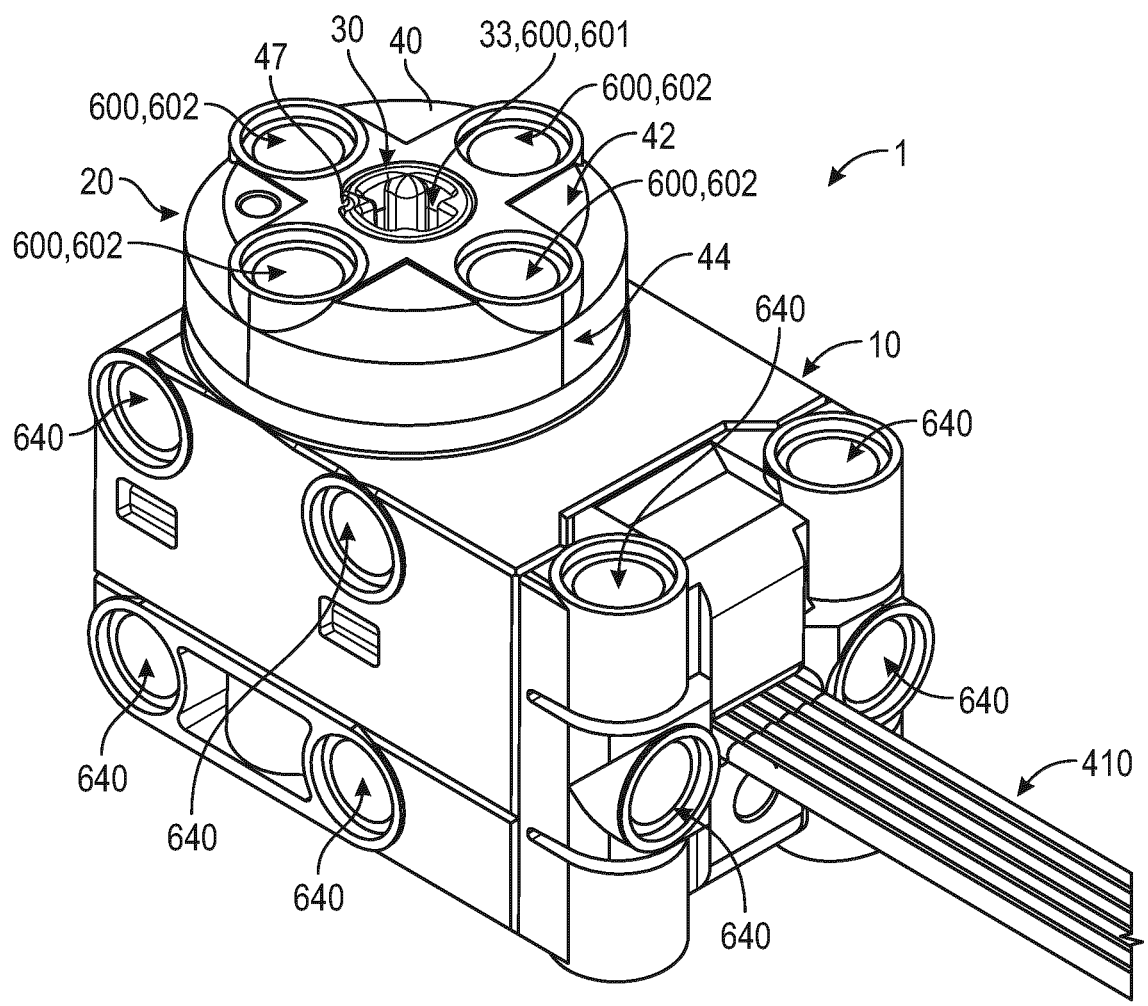
FIG. 1A, in a perspective view, shows a modular construction system motor unit according to an aspect of the disclosure and for a modular construction system according to another aspect of the disclosure.

The subject technology overcomes many of the prior art problems associated with motor units for modular construction systems. The advantages, and other features of the technology disclosed herein, will become more readily apparent to those having ordinary skill in the art from the following detailed description of certain exemplary embodiments taken in combination with the drawings and wherein like reference numerals identify similar structural elements. It should be noted that directional indications such as vertical, horizontal, upward, downward, right, left and the like, are used with respect to the figures and not meant in a limiting manner.

Figure 1B:
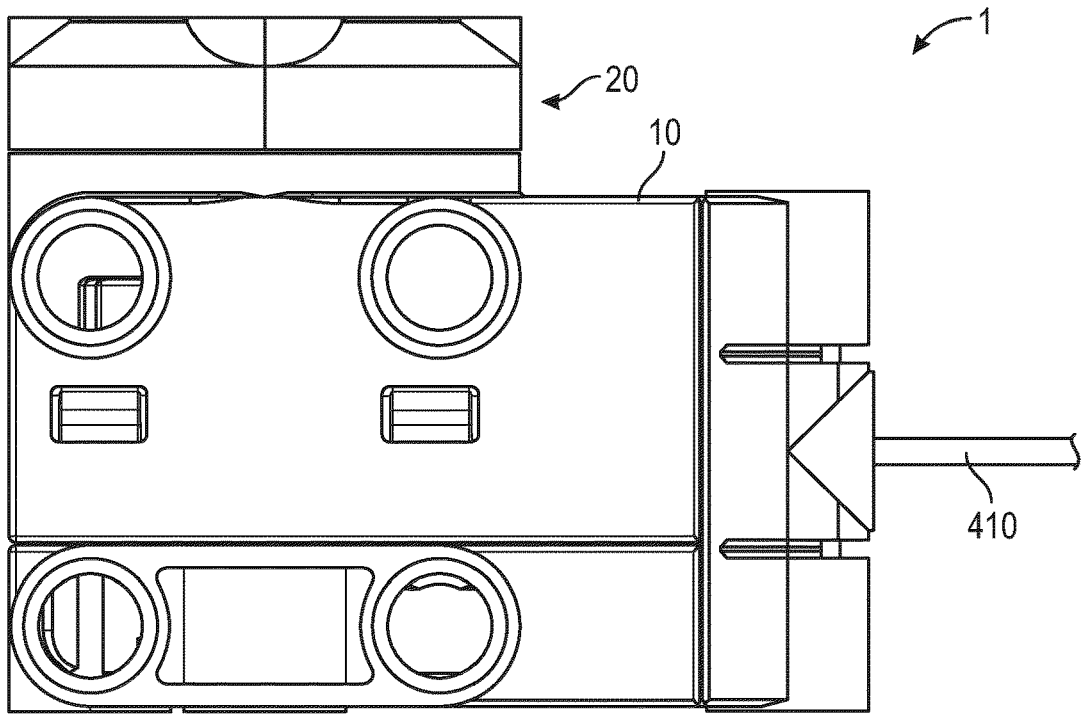
FIG. 1B, in a side view, shows the motor unit of FIG. 1A.

FIG. 1A, in a perspective view, shows a modular construction system motor unit 1 according to an aspect of the disclosure and for a modular construction system according to another aspect of the disclosure. The modular construction system motor unit 1 may simply be referred to as motor unit 1. FIG. 1B shows a side view of the motor unit 1 of FIG. 1A, and FIG. 1(C shows a top view of the motor unit 1 of FIG. 1A.

The motor unit 1 comprises a casing 10 and an electrical motor 150 mounted inside of the casing 10. The electrical motor 150 is not shown in FIG. 1A, but is visible in FIGS. 2 and 5.

The motor unit 1 further comprises a power outtake element 20, or simply outtake element 20, which extends from the casing 10, and is connected thereto in such a way the outtake element 20 may rotate relative to the casing 10.

The outtake element 20 is rotationally connected relative to the casing 10 about a rotational axis (not shown).

Figure 2:
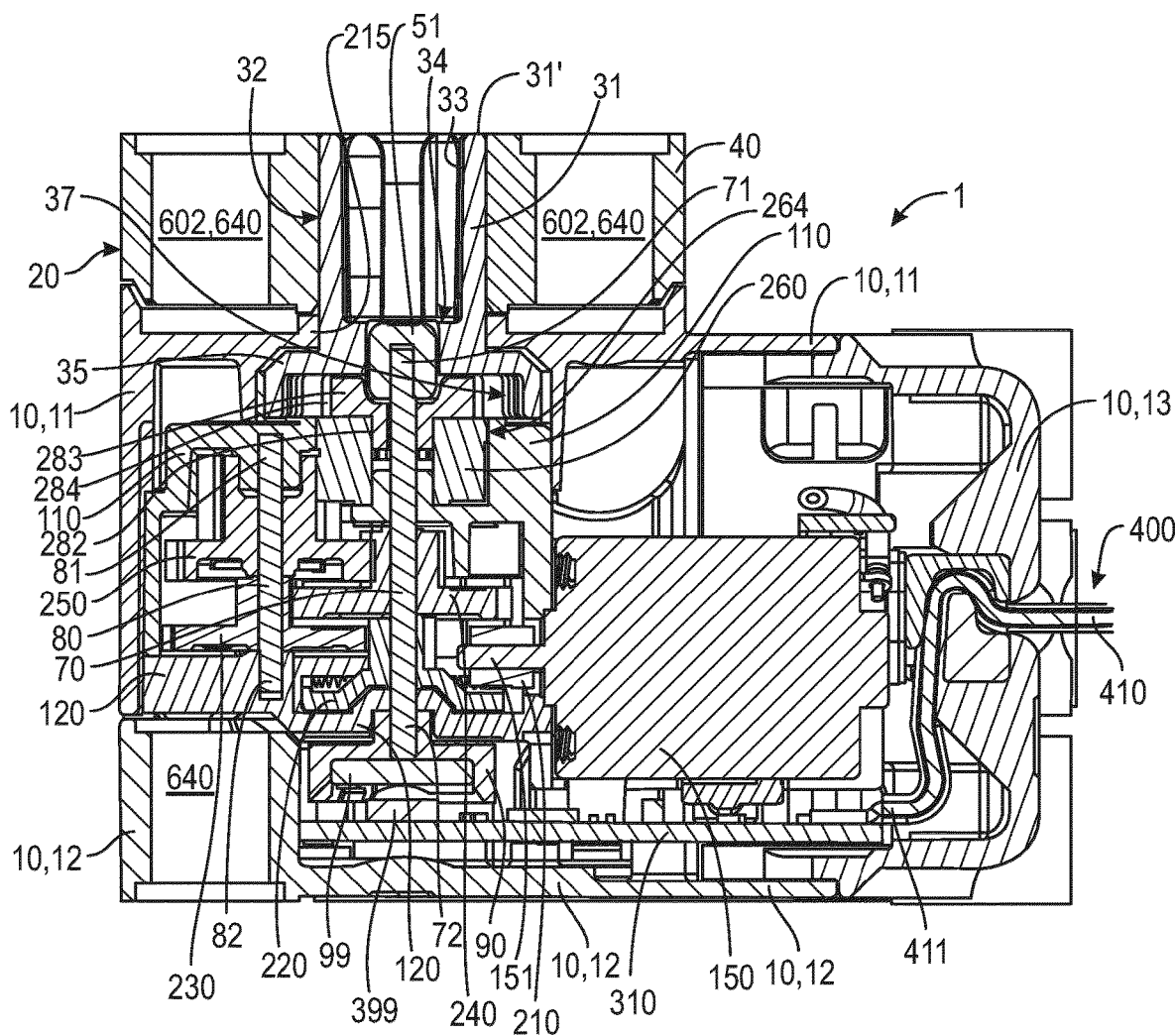
FIG. 2 is a cross-sectional side view of the motor unit, shown in FIGS. 1A-C.
Figure 4:
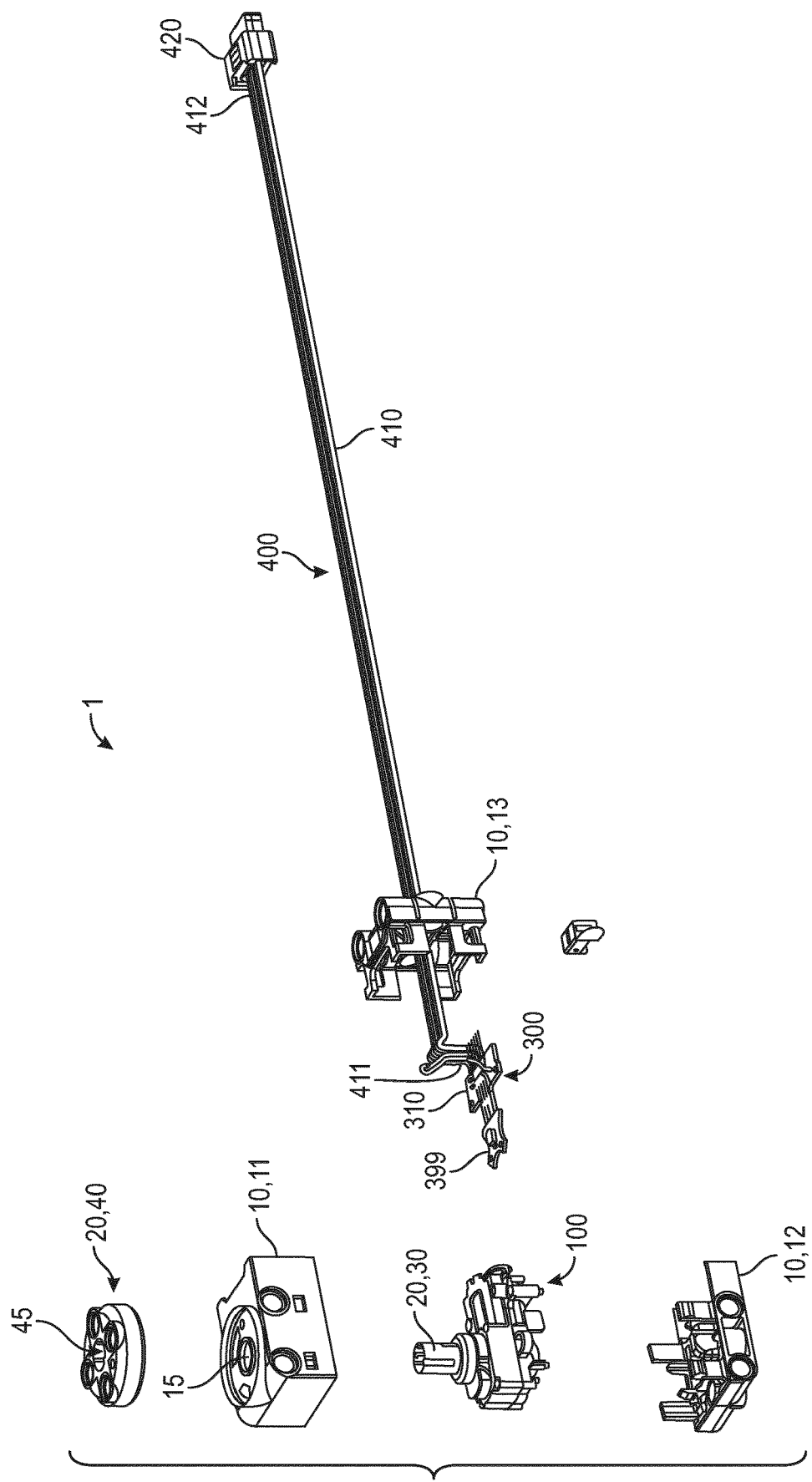
FIG. 4, in an exploded view, shows main subunits of the motor unit shown in FIGS. 1A-C, 2, and 3.
Figure 5:
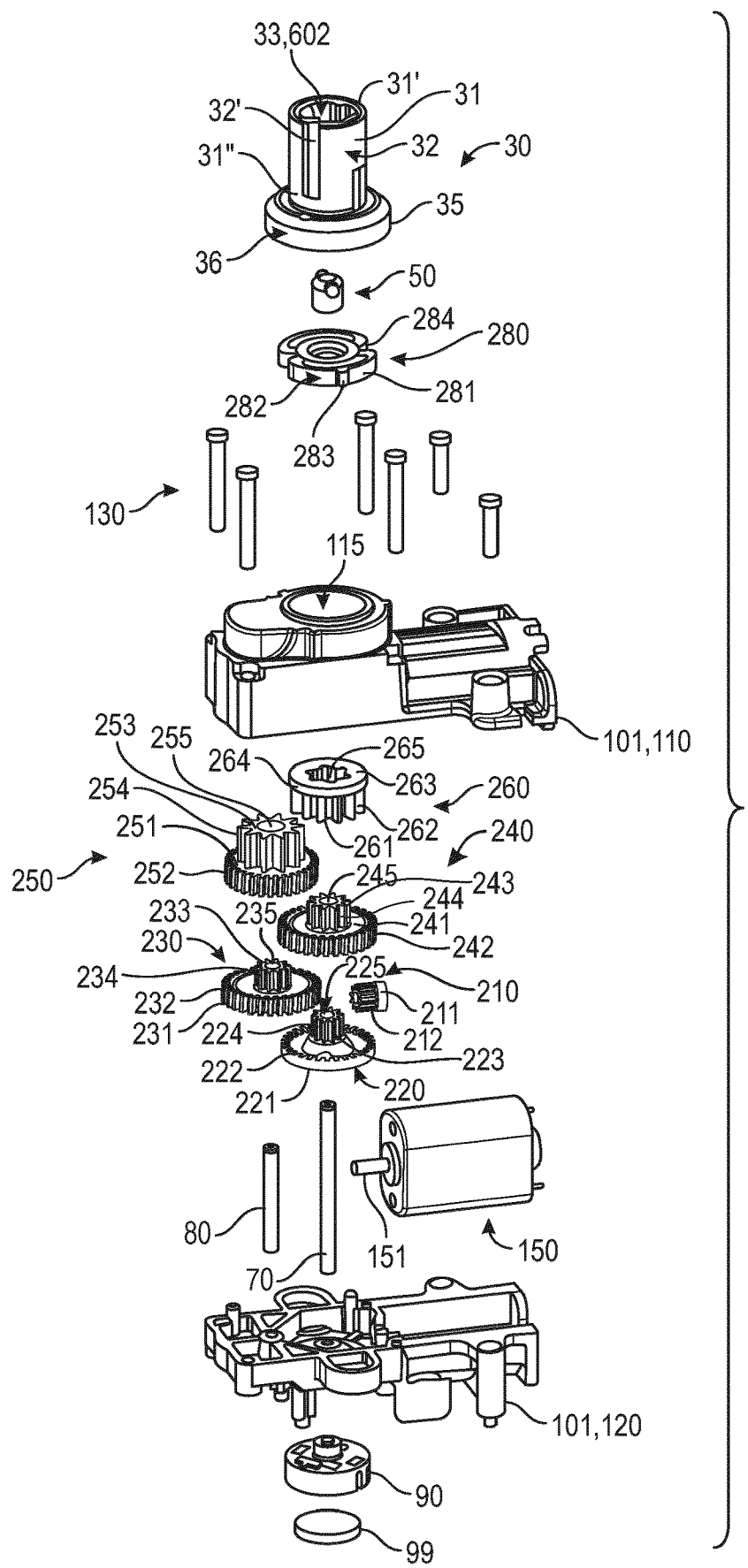
FIG. 5, in an exploded view, shows a drive subunits of the motor unit shown in FIGS. 1A-C, 2, 3 and 4.

The outtake element 20 is connected to the electrical motor 150 such that when an output axle 151, see FIGS. 2 and 5, of the electrical motor 150 rotates, the outtake element 20 is forced to rotate too. The outtake element 20 is preferably connected to the electrical motor 150 via a gear mechanism 200, for example as illustrated in FIGS. 3, 4, 5, 6, and 7A-C.

The outtake element 20 is provided with at least one connector 600 for connecting the motor unit 1 to a construction element 510, 520 of a modular construction system.

In FIG. 1 the outtake element 20 comprises five such connectors 600.

Figure 8:
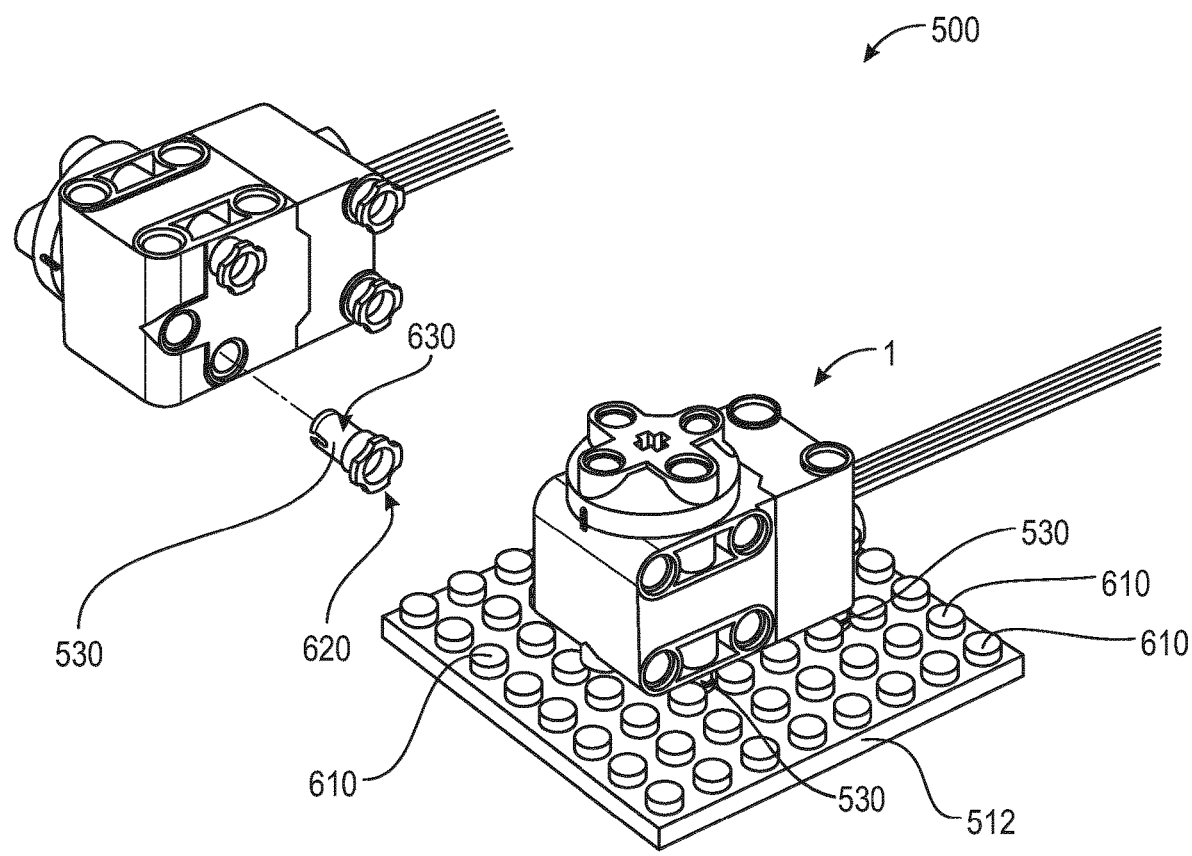
FIG. 8, in a perspective view, shows a modular construction system according to an aspect of the disclosure, and comprising a modular construction system motor unit, a set of connector elements, and a prior art construction element (belonging to a first type of construction elements), and mounting of the motor unit to the first construction element using the set of connector elements.

In the center of the outtake element 20, one connector 600, first connector 601 is shown. The first connector 601 takes the form of an indention into the outtake element 20, which has an X-shaped (cross shaped) cross section (the cross section taken perpendicular to the rotational axis of the outtake element 20). The first connector is configured for receiving an axle 524, as shown in FIG. 8, the axle 524 having a cross sectional shape (taken perpendicular to a longitudinal axis of the axle 524), corresponding to the cross sectional shape of the first connector 601, i.e. the axle has an X-shaped (cross shaped) cross section. The first connector 601 and an axle 524, as described, and belonging to a modular construction system 500 are dimensioned such that the first connector 601 and the axle 524 may form a friction fit there between.

Along a periphery of the outtake element 20, four identical connectors 600, second connectors 602 are shown. The second connectors are formed as indentions into and through the outtake element 20. The second connectors are preferably connector openings 640, as will be described in connection with FIGS. 8, 10 and 11 below.

It will be appreciated that in other not shown embodiments, the outtake element 20 may have only a centrally located connector 600, such as the first connector, and no connectors at the periphery.

It will also be appreciated that in other not shown embodiments, the outtake element 20 may have only connectors at the periphery, such as the second connectors 602, mentioned above, and no central first connector 601.

It will further be appreciated that in yet other not shown embodiments, the number, form and location (on the outtake element 20) of the connectors 600 may be different than shown in FIG. 1A. Preferably, the one or more connectors 600 are configured for cooperating with and connecting to various types of construction elements of a modular construction system for example as described below.

The casing 10 of the motor unit 1 further has a plurality of connector openings 640, which will be described in connection with FIGS. 8, 10 and 11 below, formed therein, in order to allow connection of the motor unit 1 to other construction elements of a modular construction system 500. Again it will be appreciated that other types of connecting means may be formed on the casing 10.

As described above the motor unit 1 according to the disclosure may form part of a modular construction system 500 comprising a plurality of construction elements. In the following, such a modular construction system 500 and exemplary construction elements will be described in more detail, before returning to the motor unit 1.

Figure 9:
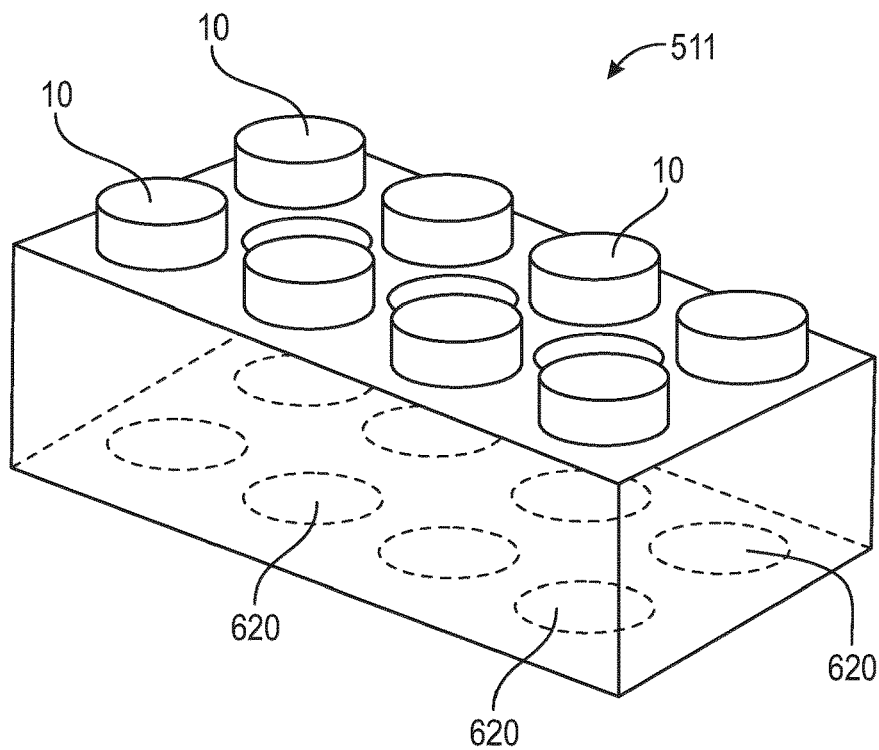
FIG. 9, in a transparent perspective view, shows a prior art construction element belonging to a second type of construction elements, the construction element having connector knobs formed on one surface and connector knob receiving openings on an opposite surface.

FIG. 9 illustrates, in a see-through perspective view, a prior art construction element 511 belonging to a first type of construction elements 510. Such first type of construction elements 510 comprises at least connector knobs 610 configured for connecting to similar but variously shaped other construction elements of the first type 510 having knob receiving openings 620. The construction element 501 shown in FIG. 9 has connector knobs 610 formed on an upper surface thereof and knob receiving openings 620 formed in an opposite surface thereof. It will be appreciated that for example two construction elements 501 as shown in FIG. 10 may be connected to each other by connecting the connector knobs 610 of one construction element 501 to a corresponding number of connector openings 620 of a second construction element 501. The connector knobs 610 and the knob receiving openings 620 form friction fits/friction connections by an outer diameter of the cylindrical connector knobs 610 being closely adapted to the dimensioning of one or more surfaces of the knob receiving openings 620.

The construction element 502 shown in FIG. 9 has eight connector knobs 610 and eight knob receiving openings 620. The connector knobs 610 are arranged in a regular two-dimensional lattice, in this case a 2×4 lattice. Similarly, the knob receiving openings 620 are arranged in a regular two-dimensional lattice, in this case a 2×4 lattice. The construction element 502 shown in FIG. 9 is shaped as a brick.

Another construction element 512 of the first type construction elements 510 is shown in FIG. 8. The construction element 512 shown in FIG. 8 is formed as a plate, and comprises 36 connector knobs 610 formed in a 6×6 lattice, and 36 knob receiving openings knobs 620 (not shown), also arranged in a 6×6 lattice, on the opposite side of the plate relative to the connector knobs 610.

Construction elements of the first type construction elements 510 are herein defined as having either connector knobs 610 or knob receiving openings 620, or both. A first type construction system is herein defined as a system of construction elements comprising two or more first type construction elements 510, where at least one construction element has connector knobs 610 arranged in a regular two-dimensional n×n lattice, where n≥2. A first type construction system is known in the art, e.g. under the trade name LEGO SYSTEM P, marketed by LEGO A/S.

Figure 10:
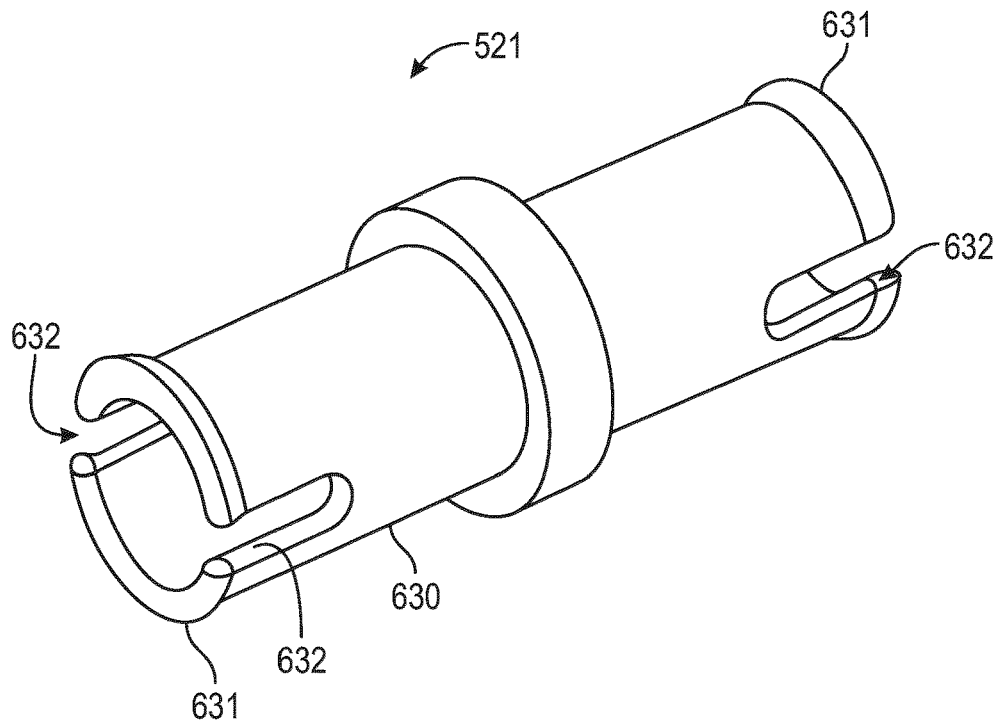
FIG. 10, in a perspective view, shows a prior art connector element for a modular construction system comprising a second type construction elements, the second type construction elements comprising connector openings, the connector element having two opposed ends, each of which comprising a snap connection configured for connecting to a connector opening of second type construction element.

FIG. 10 shows a second type construction element 521 having two cylindrical connector portions 630 formed along a common axis and facing away from each other. Second type construction element 520 may additionally or alternatively comprise cylindrical connector openings 640 configured for cooperating with other second type construction elements 520 having protruding cylindrical connector portions 630, such as e.g. a second type construction element 521 shown in FIG. 10.

Figure 11:
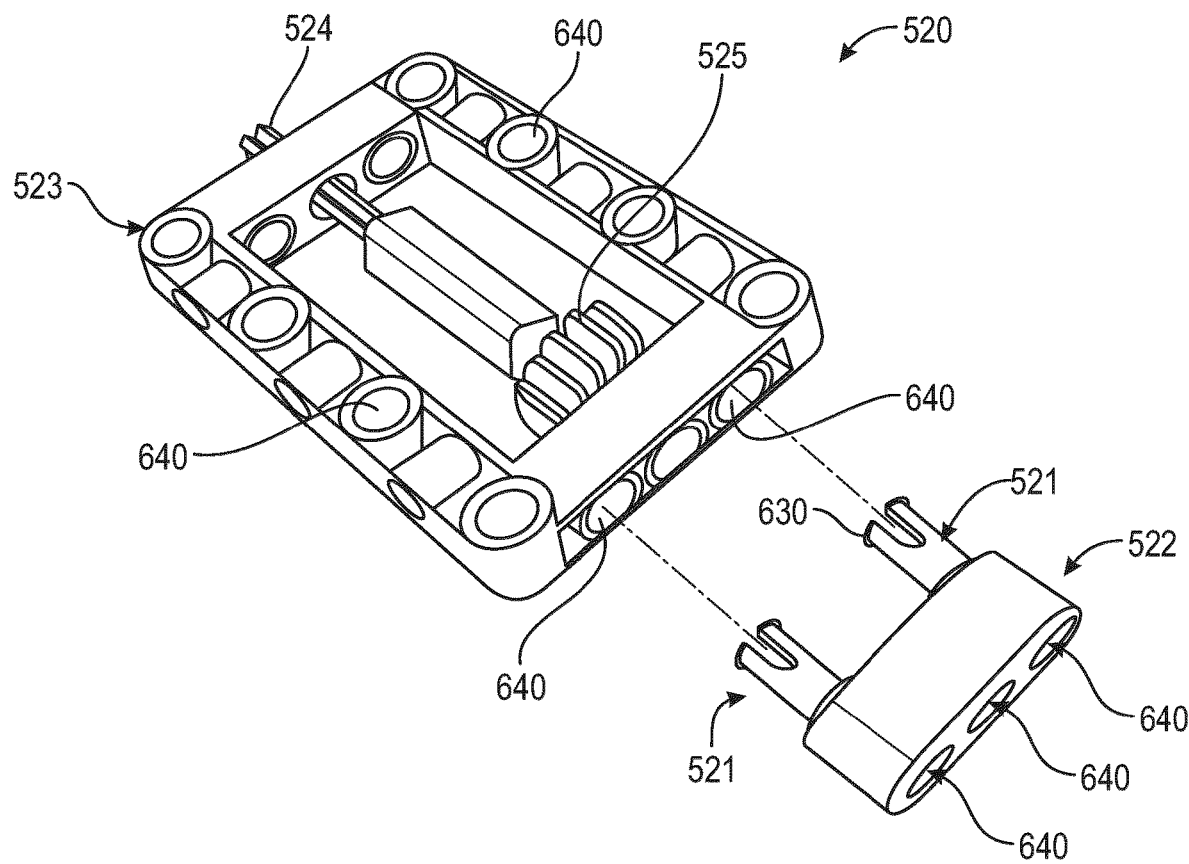
FIG. 11, in a perspective view, shows two connector elements as in FIG. 9 inserted into connector opening of one construction element of a construction system, and another construction element of the construction system having further connector openings.

FIG. 11 shows an example of a second type construction system 520 comprising second type construction elements 521, 522, 523, 524, 525 having various shapes and forms and various connection means.

The second type construction element 510, 511 shown in FIG. 10 comprises two cylindrical connector portions 630 or resilient connector pegs, each being configured to form a snap connection with a connector opening 640 formed on another second type of construction element 520.

FIG. 11 shows two other second type construction elements 520, 522, 523.

The second type construction element 522, shown to the right in the figure, is shaped as a beam having three cylindrical connector openings 640 formed there through. In two of these cylindrical connector openings 640, one end of a second type construction element 521 as shown in FIG. 10 has been inserted and has been releasably locked thereto in a snap connection.

The second type construction element 523, shown to the left in the figure, is shaped as a rectangular frame formed by four beams formed in a common plane. Two of these beams have three connector openings 640 formed with longitudinal axes parallel to the plane of the frame. It will be appreciated that each of these connector openings 640 may receive a cylindrical connector portion 630 of a second type construction element 521 as shown in FIG. 10. However, it will also be appreciated that the connector openings may also form a bearing for e.g. an axle 524 as also shown in the figure. The axle 524, shown in FIG. 11 has a cross-shape cross sectional shape.

The two beams of the frame-shaped second type construction element 523 in FIG. 11, which are formed perpendicularly to the above mentioned two beams, each have three cylindrical connector openings 640 formed there-through in the plane of the frame and four cylindrical connector openings 640 formed through the beam with longitudinal axes perpendicular to the plane of the frame. Again, it will be appreciated that each of these connector openings 640 may receive a cylindrical connector portion 630 of a second type construction element 521 as shown in FIG. 10.

The second type construction element 521 shown in FIG. 10 comprising two opposed cylindrical connector portions 630 may be used to releasably connect two other second type construction elements, such as second type construction elements 522, 523, shown in FIG. 11. In not shown variants, second type construction elements may comprise both one or more cylindrical connector openings 640 and one or more cylindrical connector portions 630.

The snap connection between a cylindrical connector portion 630 and a cylindrical connector opening 640 is provided by the cylindrical connector portion 630 being provided with a circumferentially arranged bead 631 arranged at the free end of the cylindrical connector portion 630, and by a resilience of the cylindrical connector portion 630. This resilience may be provided by one or more slits 632 formed in the longitudinal direction of the cylindrical connector portion 630. In the FIG. 10 variant two such slits 632 are shown. The diameter of the bead 631 is slightly larger than the diameter of the main body of the cylindrical connector portion 630.

A length of the cylindrical connector portion 630 corresponds to a length of the cylindrical connector openings 640. A diameter of the cylindrical connector portion 630 corresponds to a dimeter of the cylindrical connector openings 640.

Each end of the cylindrical connector openings 640 is provided with an enlarged diameter ring-shaped opening (not shown) configured to cooperate with the bead 631 formed on the cylindrical connector portion 630.

When a cylindrical connector portion 630 is pressed through a cylindrical connector openings 640 by a user, the resilience of the cylindrical connector portion 630 allows the bead 631 to be pressed through the main portion of the cylindrical connector opening 640, and when the bead reaches the enlarged diameter ring-shaped opening at the opposite end of the cylindrical connector opening 640, the resilience of the main body of the cylindrical connector portion 630 allows the bead 631 to engage with the enlarged diameter ring-shaped opening, thereby forming a snap connection between the cylindrical connector portion 630 and the cylindrical connector opening 640.

Such snap connections are known in the art.

Construction elements of the second type construction elements 520 are herein defined as having at least cylindrical connector opening 640 configured for making snap connections with cylindrical connecter portions 630 (resilient connector pegs 270) as explained above. Second type construction elements 200, may also comprise construction elements having one or more cylindrical connector portions 630. Second type construction elements 520, may also comprise construction elements having one or more cylindrical connecter portions 630 and one or more cylindrical connector opening 640.

A second type construction system is herein defined as a system of construction elements comprising two or more second type construction elements 520, where at least one construction element at least one connector opening 640. An example of a second type construction system 2000 is known in the art, e.g. under the trade name LEGO TECHNIC ©, marketed by LEGO A/S.

It will be appreciated that some second type construction elements 520 and some construction elements of a second type construction system may additionally have connector knobs 610 and/or knob receiving openings 620 as well, thereby forming a hybrid.

The right hand side of FIG. 8 illustrates a motor unit 1 according to embodiments of the disclosure being mounted on a plate shaped construction element 512, of a first type construction element 510. For this purpose, the modular construction system also comprises a connector element 530.

The connector element 530 is show in a perspective view in the left hand side of FIG. 8. The connector element 530 is configured for connecting construction elements belonging to a first type of construction elements 510 and construction elements, belonging to a second type of construction elements 520 as defined above. One or more connector element(s) 530 may further form part of a construction system 500 comprising a motor unit 1 and further comprising one or more first type of construction elements 510 and/or one or more second type of construction elements 520. The connector element 530 at one end comprises a cylindrical connecter portions 630 allowing connection to cylindrical connector openings 640 as described above. At another end, the connector element 530 comprise a knob receiving opening 620 allowing the connector element 530 to connect to a knob 610. The knob receiving opening 620 is provided on a cylindrical part of the connector element 530 having a size and shape configured for being connected between four connector knobs 610 of a construction element of the first type 510, such as the plate-shaped first type construction element 512 shown in FIG. 8.

The electrical motor unit 1 has cylindrical connector openings 640 and can therefore be connected to a second type construction element 520 having cylindrical connecter portions 630, or to the connector element 530 as shown in FIG. 8.

In FIG. 8, the electrical motor unit 1 is connected to the plate 512 via four connecter elements 530, each of which has a cylindrical connector portion 630 inserted into a cylindrical connector opening 640 on the electrical motor unit 1, and it's oppositely arranged cylindrical part connected between four neighbouring connector knobs 150 on the plate 104.

Figure 1C:
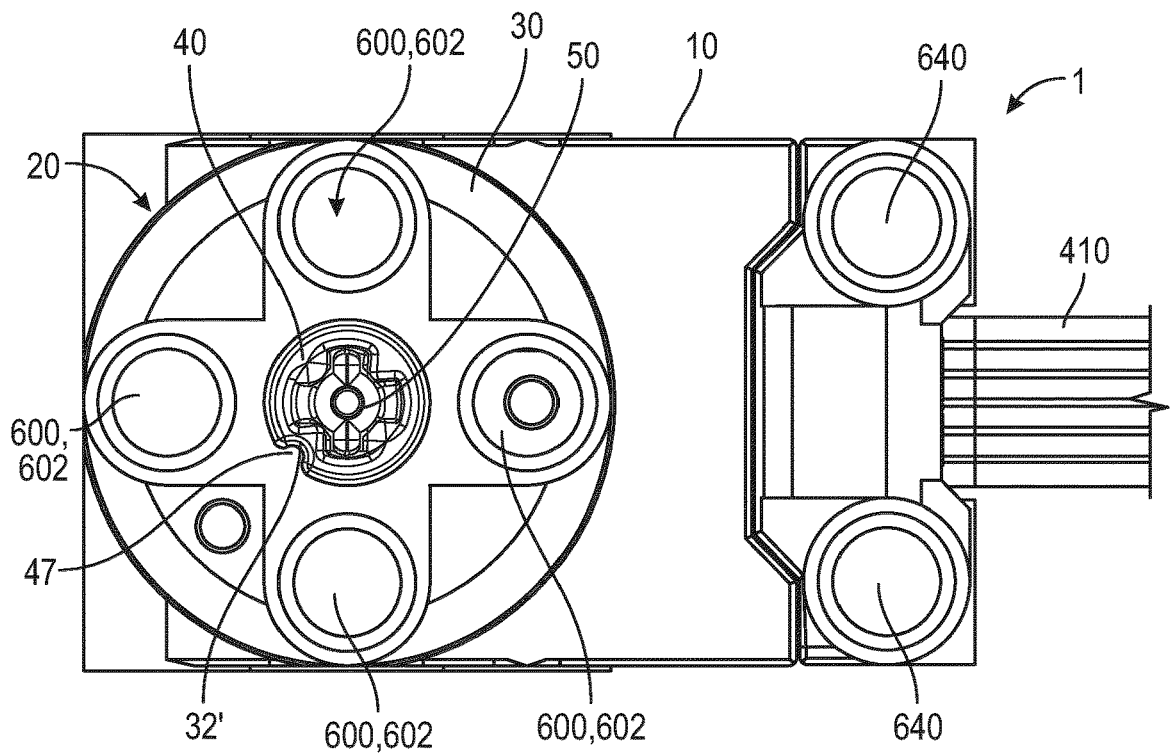
FIG. 1C, in a top view, shows the motor unit of FIG. 1A.

Now, returning to the motor unit 1 as such, and as mentioned above, the casing 10 of the motor unit 1—as shown in FIGS. 1A-C comprises a plurality of connection means in the form of connector opening 640. However, in not shown embodiments, the casing may alternatively or additionally be provided with other types of connecting means, such as the above mentioned connector knobs 610, knob receiving openings 620, and/or cylindrical connecter portions 630, or in yet other embodiments, connector means suitable for other types of modular construction systems.

Figure 3:
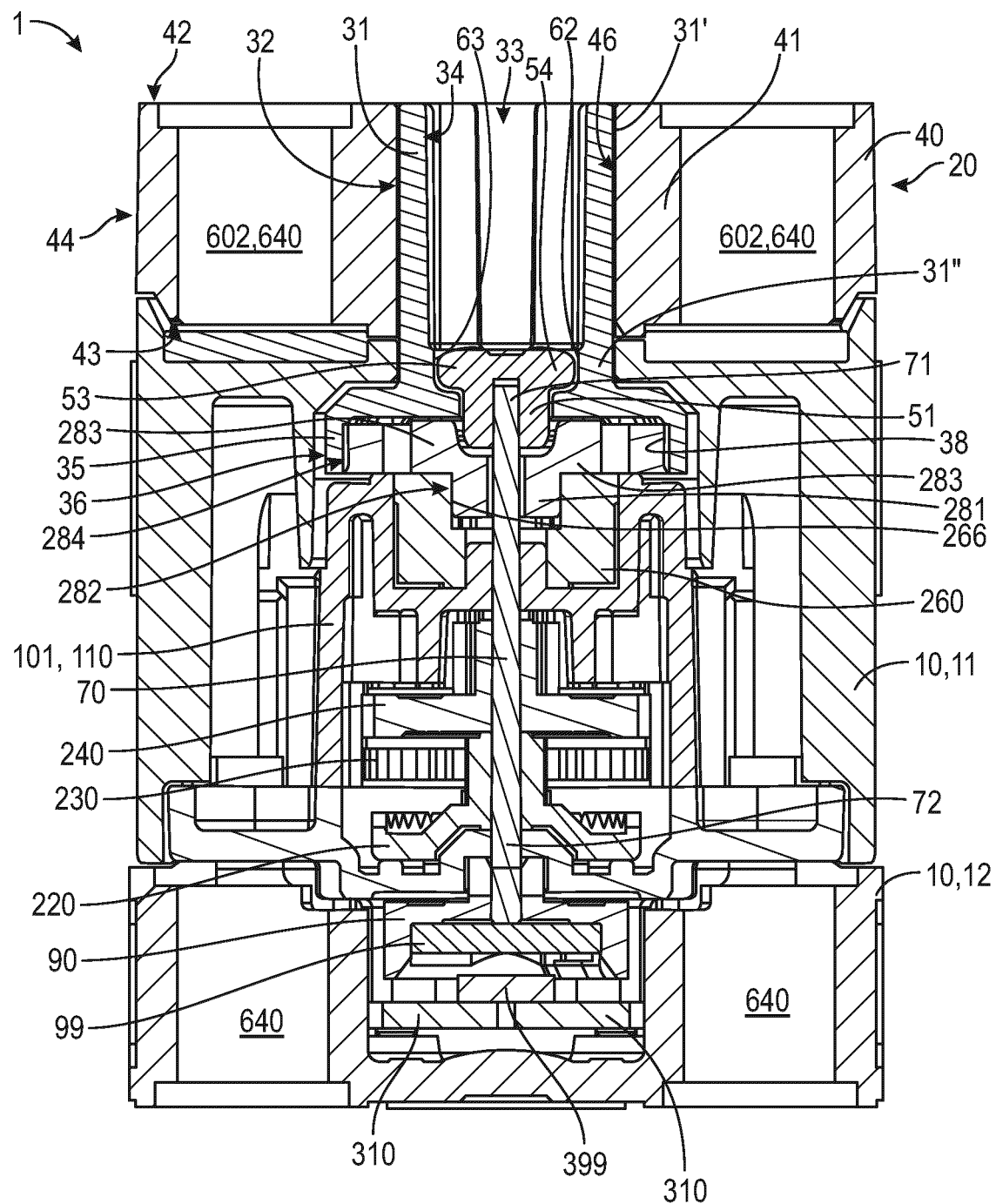
FIG. 3 is a cross-sectional end view of the motor unit, shown in FIGS. 1A-C.

As mentioned, and as shown in FIGS. 2 and 3, the power outtake power outtake element 20 is connected to the electrical motor 150 via a gearing mechanism 200 provided between the electrical motor 150 and the power outtake element 20. An exemplary gear mechanism will be described in further detail below.

However, as also shown in FIGS. 2 and 3, the motor unit 1 further comprises a rotation sensing mechanism. The rotation sensing mechanism is configured for sensing the rotational position of the power outtake element 20 relative to the casing 10. For this purpose the rotation sensing mechanism comprises a disc element 99, such as a permanent magnet. The disc element 99 is connected to the power outtake element 20 or to a gear of the gear mechanism, such that the disc element 99 and the power outtake element 20 rotates together, or at least proportionally. An exemplary connection between the disc element 99 and the power outtake element 20 will be described in further detail below. However, from FIGS. 2 and 3 it will be appreciated that the disc element 99 is connected to the power outtake element 20 via a first axle 70.

The rotation sensing mechanism further comprises a sensor device 399 being fixed relative to the casing.

As shown in e.g. FIGS. 2 and 3, the sensor device 399 is fixed to a printed circuit board (PCB) 310 forming part of a control subunit 300, which constitutes a control mechanism for the motor unit 1. The printed circuit board (PCB) 310 is fixed relative to the casing 10, whereby the sensor device 399 is fixed relative to the casing 10.

The sensor device 399 is an encoder/rotation sensor, for example an optical sensor capable of registering rotations of the disc element 99 optically, or a magnetic field sensor, when the disc element 99 is a magnet, or an element having magnetic properties.

In the embodiments shown in the FIGS. 2, 3, 5, 6, and 7, the disc element 99 is connected to the power outtake element 20 via a first rotation transfer part 50 being fixedly connected to the disc element 99 and to a receptacle 60 for receiving the first rotation transfer part 50, which receptacle 60 is formed in the power outtake element 20.

However, alternatively, the disc element 99 may be connected to a gear of the gear mechanism 200 via a first rotation transfer part 50 similar to the one shown in the figures. This is not shown in the figures. However, also in this case the first rotation transfer part 50 would be fixedly connected to the disc element 99. The first rotation transfer pan 50 would be connected to said gear of the gear mechanism 200, for example the lowermost gear 220 shown in FIGS. 2, 3 and 5, via a receptacle 60 for receiving the first rotation transfer part 50, which receptacle 60 would then be formed in the gear of the gear mechanism 200.

In either case the receptacle 60 and the first rotation transfer part 50 have cooperating shapes and sizes configured to allow a slight rotation of the power outtake element 20 before the first rotation transfer part 50 is engaged for rotation with the outtake element 20.

As mentioned, the receptacle 60 may in preferred embodiments and as shown in the figures be provided in the power outtake element 20, and this will be described in further detail in the following. It will however be appreciated that the cooperation between the receptacle 60 and the first rotation transfer part 50 described in the following may also apply to embodiments, where the receptacle 60 is formed in the gear.

The casing 10 of the motor unit 1 may as shown in e.g. FIG. 4 comprise three parts a top part 11, a bottom part 12 and an end part 13. The parts of the casing 10 protects the internal components (electrical motor 150, gear mechanism 200, control subunit 300 etc.) from damage, and secures their interrelation/arrangement by forming support for mounting the internal components.

The three parts 11, 12, 13 allows assembly of the internal components, and may be connected to each other via snap connections, screws or in any other way known in the art. In some embodiments the casing 10 may be disassembled to allow maintenance of the motor unit 1, such as replacement of components. In other embodiments the parts may be connected such that at least unauthorized disassembly is prevented.

The casing 10 comprises an opening 15, here shown in the top part 11, which forms a bearing for a portion of the power outtake element 20. The opening 15 in the casing has a first diameter.

In some embodiments, and as shown in the figures, the power outtake element 20 is formed by two parts, an inner power outtake element 30 and an outer power outtake element 40. The above mentioned first connector 600, 601 is formed in the inner power outtake element 30, and the second connectors 600, 602 are formed in the outer power outtake element 40. The inner power outtake element 30 and the outer power outtake element 40 are connected to each other in a rotation preventing way (relative to each other) by an elongate protrusion 47 formed in an inwardly facing/inner surface 46 of the outer power outtake element 40 cooperating with a notch 32' formed as an indentation in the outer surface 32 of a top part 31 of the inner power outtake element 30.

The inner power outtake element 30, see e.g. FIG. 5, comprises a top part 31 and a bottom part 35. The top part 31 is cylindrical and has a second diameter. The top part is configured to extend through the opening 15 in the casing 10. The diameter of the top part 31, the second dimeter is configured to allow rotation of inner power outtake element 30 relative to the casing 10. The bottom part 35 is also cylindrical and has a third diameter, which third diameter is larger than the diameter of the top part 31, such that, when the inner power outtake element 30 is inserted in the opening 15 in the casing 10, an upwardly facing surface of the bottom part 35 may interact with an inwardly facing surface of the casing 10, surround the opening 15, prevents the axial movement of the inner power outtake element 30, in one axial direction. The outer power outtake element 40 is connected to the top part 31 of the inner power outtake element 30 on the opposite side of the casing 10 relative to the bottom part 35 of the inner power outtake element 30, as indicated in the exploded view of FIG. 4. The bottom part 35 of the inner power outtake element 30 is arranged on the inner side of the casing 10 while the top part 31 of the inner power outtake element 30 extends through the opening 15 through the casing 10 and the outer power outtake element 40 is connected to the op part 31 of the inner power outtake element 30 on the outside of the casing 10. Thereby, the inner power outtake element 30 is prevented from axial movement in the other axial direction.

The outer power outtake element 40, see FIGS. 3 and 4, comprises a body 41, having an upper surface 42 and a lower surface 43, and an outer surface 44. An opening 45 is arranged through the body 41 of the outer power outtake element 40 from the upper surface 42 to the lower surface 43, the opening 45 being configured for receiving a portion of the top part 31 of the inner power outtake element 30. The opening 45 through the body 41 of the outer power outtake element 40 comprises an inwardly facing surface, inner surface 46. A protrusion 47 is formed on and extending inwardly from the inner surface 46 of the outer power outtake element 40.

The top part 31 of the inner power outtake element 30 comprises an outer end 31' and an inner end 31" and has an outer surface 32, see FIG. 4.

The bottom part 35 of the inner power outtake element 30 comprises an outer end and an inner end, and an outer surface 35. The outer end of the bottom part 35 connects to the inner end 31" of the top part 31 of the inner power outtake element 30, see e.g. FIG. 4. Preferably, the top part 31 and the bottom part 35 of the inner power outtake element 30 are formed in one piece as one integrated part.

As also mentioned above, an elongate notch 32' is formed as an elongate indentation in the axial direction of the outer surface 32 of the top part of inner power outtake element 30, and configured for cooperating with the protrusion 47 formed on and extending inwardly from the inner surface 46 of the opening 45 through the outer power outtake element 40.

An inner space 33 is provided in the top part 31 of inner power outtake element 30. The inner space 33 has a bottom formed at the inner end 31" of the top part 31 and is open at the outer end 31' of the top part. Thereby the inner space 33 can be considered to be cup-shaped.

The top part 31 of the inner power outtake element 30 has an inwardly facing surface, inner surface 34, defining the inner space 33, see FIG. 3.

Figure 6:
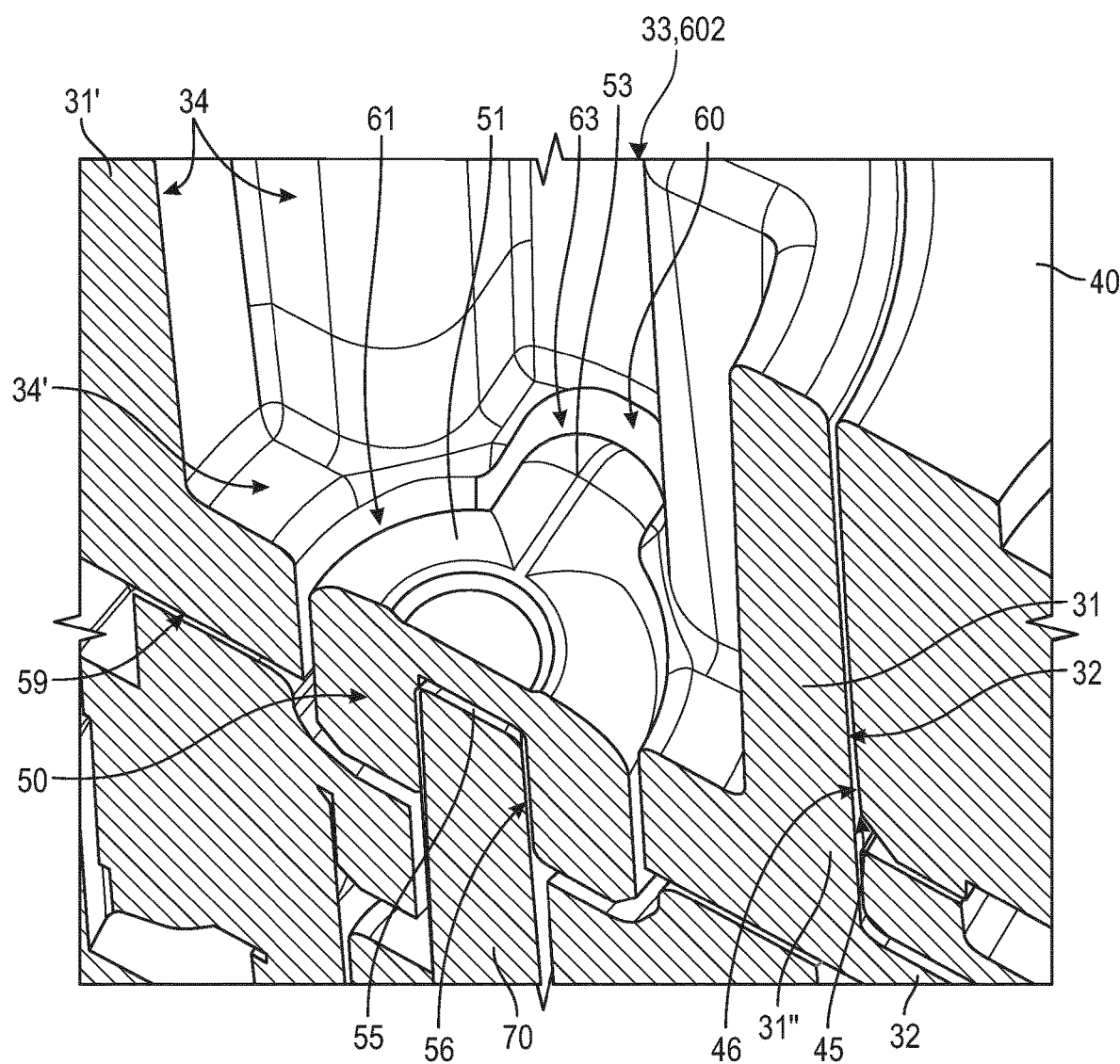
FIG. 6, in a sectional perspective view, show detail of a power outtake element of the motor unit shown in FIGS. 1A-C, 2, 3 and 4.

The inner space 33 of the top part 31 of the inner power outtake element 30 may constitute the above mentioned second connector 602. Thus, the cross-section (taken perpendicular to the axial direction of the top part 31 of the inner power outtake element 30) may as described be cross shaped/X-shaped in order to receive a similarly cross shaped/X-shaped axle, such as the axle 524 shown in FIG. 11. The cross shaped cross-section of the inner space 33 may also be appreciated from FIG. 6 showing a section through a power outtake element 20, a receptacle formed 60 therein, a first rotation transfer part 50, and a first axle 70. The power outtake element 20 is shown having an inner power outtake element 30 and an outer power outtake element 40. FIG. 6 also shows that the inner space 33 of the top part 31 of the inner power outtake element 30 has a bottom surface 34' at the inner end 32" of the top part 31, as may also be appreciated in FIG. 7C.

An inner space 37 is provided in the cylindrical bottom part top part 35 of inner power outtake element 30. This inner space 37 also has a bottom or end wall formed, but formed at the outer end of the bottom part 35 and is open at the inner end of the bottom top part. Thereby the inner space 37 can be considered to be cup-shaped. Contrary to the inner space 33 of the top part 31, this inner space 37 opens downward and into the inner of the casing 10.

The bottom part 35 of the inner power outtake element 30 has an inwardly facing surface, inner surface 38, defining the inner space 37, see FIG. 3.

The inner surface 38 of the bottom part 35 of the inner power outtake element 30 has a cross-sectional shape (taken perpendicular to the axial direction of the cylindrical bottom part 35 of the inner power outtake element 30) allowing cooperation with/connection to an outer surface 284 of a upper part 283 of an outtake disc 280 of the gear mechanism 200, this outer surface 284 having a cross-sectional shape complementary to the cross-sectional shape of the inner surface 38 of the bottom part 35 of the inner power outtake element 30, see FIGS. 2 and 3.

The inner power outtake element 30 is in this way driven by the output disc 280 of the gear mechanism 200.

With reference to FIGS. 2, 3 and 5, the connection between the electrical motor 150 and the power outtake element 20 is nor discussed in further detail.

As mentioned, the electrical motor 150 has a motor output axle 151, see FIGS. 2 and 5. The motor output axle 151 is connected to a first gear 210, fixed on the motor output axle 151.

The first gear 210 has an outer surface 211 provided with gear teeth 212, and is configured for cooperating with a second gear 230.

The second gear 220 is rotationally supported by—but may rotate freely relative to—a first axle 70. The second gear 220 comprises a through-going opening 225 (in the axial direction) for this purpose.

The second gear 220 further comprises a large diameter part 221 and a small diameter part 223. The large diameter part 221 comprises gear teeth 222 configured for cooperating with the gear teeth 212 of the first gear 210.

As shown in FIGS. 2 and 5 the output axle 151 of the electrical motor 150 is arranged perpendicular to the rotation axis of the second gear wheel 220. For this purpose the gear teeth 222 on the large diameter part 221 of the second gear wheel 220 is provided on an upwardly facing surface of the large diameter part 221. This arrangement allows for a very compact motor unit since the rotation axes of the gear mechanism 200 is perpendicular to the electrical motor 150 output axle 151, which allows the gear mechanism to be compactly located at the end of the electrical motor 150.

It will be appreciated, however, that in other embodiments (not shown), the axes of the gear mechanism 200 and the axis of the output axle 151 from the electrical motor 150 may be arranged in parallel. It will be appreciated that in such embodiment the gear teeth 222 on the large diameter part 221 of the second gear wheel 220 could instead be provided on an outwardly facing surface of the large diameter part 221 (not shown).

The large diameter part 221 and the small diameter part 223 of the second gear 220 are preferably formed as a single unitary structure.

The small diameter part 223 of the second gear 220 comprises gear teeth 224 formed on an outer surface thereof and configured for cooperating with a third gear 230 of the gear mechanism 200.

The third gear 230 is rotationally supported by—but may rotate freely relative to—a second axle 80. The third gear 230 comprises a through-going opening 235 (in the axial direction) for this purpose.

The second axle 80 is arranged parallel to the first axle 70.

The third gear 230 further comprises a large diameter part 231 and a small diameter part 233. The large diameter part 231 comprises gear teeth 232 formed thereon, and configured for cooperating with the gear teeth 224 formed on the small diameter part 222 of the second gear 220.

The large diameter part 231 and the small diameter part 233 of the third gear 230 are preferably formed as a single unitary structure.

The small diameter part 233 of the third gear 230 comprises gear teeth 234 formed on an outer surface thereof, and configured for cooperating with a fourth gear 240 of the gear mechanism 200.

The small diameter part 222 of the second gear 220 comprises gear teeth 224 formed on an outer surface thereof and configured for cooperating with a third gear 230 of the gear mechanism 200.

The third gear 230 is rotationally supported by—but may rotate freely relative to—a second axle 80. The third gear 230 comprises a through-going opening 235 (in the axial direction) for this purpose.

The second axle 80 is arranged parallel to the first axle 70.

The third gear 230 further comprises a large diameter part 231 and a small diameter part 233. The large diameter part 231 comprises gear teeth 232 formed thereon, and configured for cooperating with the gear teeth 224 formed on the small diameter part 222 of the second gear 220.

The large diameter part 231 and the small diameter part 233 of the third gear 230 are preferably formed as a single unitary structure.

The small diameter part 231 of the third gear 230 comprises gear teeth 232 formed on an outer surface thereof, and configured for cooperating with a fourth gear 240 of the gear mechanism 200.

The fourth gear 240 is rotationally supported by—but may rotate freely relative to—a first axle 70. The fourth gear 240 comprises a through-going opening 245 (in the axial direction) for this purpose.

The fourth gear 240 further comprises a large diameter part 241 and a small diameter part 243. The large diameter part 241 comprises gear teeth 242 formed on an outer surface thereof, and configured for cooperating with the gear teeth 234 formed on the small diameter part 233 of the third gear 230.

The large diameter part 241 and the small diameter part 243 of the fourth gear 240 are preferably formed as a single unitary structure.

The small diameter part 243 of the fourth gear 240 comprises gear teeth 244 formed on an outer surface thereof, and configured for cooperating with a fifth gear 250 of the gear mechanism 200.

The fifth gear 250 is rotationally supported by—but may rotate freely relative to—the second axle 80. The fifth gear 250 comprises a through-going opening 255 (in the axial direction) for this purpose.

The fifth gear 250 further comprises a large diameter part 251 and a small diameter part 253. The large diameter part 251 comprises gear teeth 252 formed on an outer surface thereof, and configured for cooperating with the gear teeth 244 formed on the small diameter part 243 of the fourth gear 240.

The large diameter part 251 and the small diameter part 253 of the fifth gear 250 are preferably formed as a single unitary structure.

The small diameter part 253 of the fifth gear 250 comprises gear teeth 254 formed on an outer surface thereof, and configured for cooperating with a sixth gear 260 of the gear mechanism 200.

The sixth gear 260 is rotationally supported by—but may rotate freely relative to—the first axle 70. The sixth gear 260 comprises a through-going opening 265 (in the axial direction) for this purpose.

The sixth gear 260 further comprises a lower part 261 and an upper part 263. The lower part 261 comprises gear teeth 262 formed on an outer surface thereof, and configured for cooperating with the gear teeth 254 formed on the small diameter part 253 of the fifth gear 250.

The lower part 261 and the upper part 263 of the sixth gear 260 are preferably formed as a single unitary structure.

The upper part 263 of the sixth gear 250 is cylindrical and comprises an outer surface 264, which is configured for interacting with an inwardly facing surface 116 of first opening 115 through a portion of the casing 10 in the form of a housing drive subunit housing part 110 (see below). The first opening 115 forms a bearing or support for the sixth gear 260 and allows rotation of the sixth gear 260 relative to the casing 10.

The through-going opening 265 of the sixth gear 260 further has an inwardly facing surface 266, see FIG. 3, which has a profiled cross-sectional shape (perpendicular to the axial direction of the sixth gear 260), which is configured for cooperating with a similarly profiled outer surface 282 of a lower part 281 of the outtake disc 280, which was mentioned previously. The profiled cross-sectional shape inwardly facing surface 266 and the profiled outer surface 282 of a lower part 281 of the outtake disc 280 are complementary such that, when the lower part 281 of the outtake disc 280 is inserted into the through-going opening 265 of the sixth gear 260, the outtake disc 280 and the sixth gear 260 interlock, and thereby rotate together, see FIG. 3.

Preferably, the profiled cross-sectional shape inwardly facing surface 266 and the profiled outer surface 282 of a lower part 281 of the outtake disc 280 are complementary such that that the lower part 281 of the outtake forms a friction fit with at least the upper portion of the through-going opening 265 of the outtake disc 280.

The outtake disc 280 thus comprises a lower part 281 and an upper part 283. As mentioned, the lower part 281 comprises an outer surface, which is profiled. The upper part 283 of the outtake disc 280 also comprises an outer surface 284. A general diameter of the outer surface 284 of the upper part 283 of the outtake disc 280 is larger than a general outer diameter of the lower part 281 of the outtake disc 280. The outer surface of the upper part 283 of the outtake disc 280 is preferably also profiled, and configured for cooperating with the inwardly facing surface, inner surface 38, of the inner space 37 of the bottom part 35 of the inner power outtake element 30.

As also mentioned above, the inner surface 38 of the bottom part 35 of the inner power outtake element 30 has a cross-sectional shape (taken perpendicular to the axial direction of the cylindrical bottom part 35 of the inner power outtake element 30) which is complementary with the outer surface 284 of a upper part 283 of the outtake disc 280 of the gear mechanism 200, in such a way that the outtake disc 280 and the inner power outtake element 30 will rotate together.

It is further noted that the outtake disc 280 of the gear mechanism 200 has a through-going opening 285 (in the axial direction thereof). The through-going opening 285 of the outtake disc 280 is configured for receiving the first axle 70, such that the first axle and the outtake disc 280 are allowed to rotate relative to each other.

From the above description of the gear mechanism, it is clear that a rotation induced by the electrical motor 150 of the outtake axle 151 with the first fear 210 pinched thereto, will cause a rotation of the second gear 220, rotatable relative to the first axle 70, and the casing 10. Rotation of the second gear 220 will cause a rotation of the third gear 230, rotatable relative to the second axle 80, and the casing 10.

Rotation of the third gear 230 will cause a rotation of the fourth gear 240, rotatable relative to the first axle 70, and the casing 10. Rotation of the fourth gear 240 will cause a rotation of the fifth gear 250, rotatable relative to the second axle 80, and the casing 10. Rotation of the fifth gear 250, will cause a rotation of the sixth gear 260, rotatable relative to the first axle 70, and the casing 10. Rotation of the sixth gear 260 will cause a rotation of the outtake disc 280, rotatable relative to the first axle 70, and the casing 10. Rotation of the outtake disc 280 will cause a rotation of the inner power outtake element 30, and the outer power outtake element 40 connected thereto. Therefore, rotation induced by the electrical motor 150 will cause the power outtake element 20 to rotate. It is clear that a construction element 510, 520 attached to the power outtake element 20 via the first connector 601 or the second connectors 602 will thereby be rotated.

In the above, the diameters, number of gear teeth, gear ratios, etc. has not been described. It will however be clear for the person skilled in the art, that a suitable gear ration may be chosen, by a suitable dimension of the gears 210, 220, 230, 240, 250, 260.

In the above, it has not been described in detail how parts of the casing 10, including inner structures of the casing 10, may provide bearings and other support for the gears 210, 220, 230, 240, 250, 260, and for the first axle 70 and the second axle 80, and possibly other of the described components or parts thereof Other types of gear mechanisms may alternatively be used, for example gear mechanisms having a different number of gears and/or other gear ratio, etc.

Thus, above it has been described how power (rotation) may be transferred from the electric motor 150 to the power outtake element 20.

Now turning to FIGS. 7 and 7A-C, it will be described how rotation may be transferred from the power outtake element 20 to the disc element 99, in such a way that an asymmetric load on the power outtake element 20 is not transferred to the disc element 99.

As shown in FIG. 7B the first rotation transfer part 50 comprises body 51 which is essentially cylindrical. The body 51 of the first rotation transfer part 51 has an outer surface 52. Extending from the cylindrical body 51 of the first rotation transfer part 50 is a first arm 53 and a second arm 54. The first arm 53 and the second arm 54 of the first rotation transfer part are located diametrically opposite from each other, and extending from the outer surface 52 of the cylindrical body 51 of the first rotation transfer part 50. In other embodiments only a single arm is provided (not shown).

FIG. 7B, also shows that the first and second arms 53, 54 of the first rotation transfer part 50 has a width, first width W1.

FIG. 6 shows a section through a power outtake element 20 (comprising an inner power outtake element 30 and an outer power outtake element 40), a receptacle 60 formed therein, a first rotation transfer part 50, and a first axle 70.

FIG. 6 also shows that the first rotation transfer part 50 comprises an inner space 55 provided in the body 51 of the first rotation transfer part 50. The inner space 55 has an inwardly facing surface, inner surface 56, which is configured for cooperating with a first end 71 of the first axle 70. The first rotation transfer part 50 may be pinched onto the first end 71 of the first axle 70, such that a rotation of the first rotation transfer part 50 will be transferred to the axle 70.

The first axle 70 is elongate and comprises a first end 71 and a second end 72 opposite thereto. As shown in FIGS. 2 and 3, the first axle 70 extends from its connection to the first rotation transfer part 50, through the some of the gears 260, 240, 220 of the dear mechanism an towards the PCB 310 with the sensor device 399 provided next to an inner surface of the casing 10 opposite to the first rotation transfer part 50 and opposite to the power outtake element 20.

As further shown in FIGS. 2 and 3, a disc element holder 90 may be provided at the second end 72 of the axle 70.

The disc element holder 90 is attached to the second end 72 of the axle 70, such that a rotation of the axle 70 forces the disc element holder 90 to rotate therewith.

The disc element holder 90 is configured to receive the disc element 99, such that when the disc element holder 90 rotates, the disc element 99 rotates therewith.

The first rotation transfer part is received in the receptacle 60. The receptacle 60 is provided in the power outtake element 20. More precisely, the receptacle 60 is provided in the inner power outtake element 30 of the power outtake element 20.

As shown in e.g. FIG. 6, the inner space 33 of the top part 31 of the inner power outtake element 30 has an end surface 34'. Further, the inner space 37 of the bottom part 35 of inner power outtake element 30 has and end wall 39. A wall separating the top part 31 and the bottom part 35 of the inner power outtake element 30 defines the end surface 34' of the inner space 33 of the top part 31 and the end surface 39 of the inner space 37 of the bottom part 35.

The receptacle 60 is formed as a through-going hole in the wall separating the top part 31 and the bottom part 35 of the inner power outtake element 30. The receptacle extends from the end surface 34' of the inner space 33 of the top part 31 to the end surface 39 of the inner space 37 of the bottom part 35.

A cross sectional shape (taken perpendicularly to the axial direction of the inner power outtake element 30) of the receptacle 60 corresponds to a cross sectional shape (taken perpendicularly to the axial direction of the first rotation transfer part 50) of the first rotation transfer part 50.

The receptacle 60, as shown in e.g. the FIGS. 6, 7A, 7C has main trough 61. The main trough has an inwardly facing surface 62.

The main trough 61 of the receptacle 60 is configured to receive the body 51 of the first rotation transfer part 50. The body 51 of the first rotation transfer part 50 has a shape corresponding to the trough 61, such that when the first rotation transfer part 50 is rotated, the power outtake element 20 is brought to rotate therewith. The shape of the body 51 of the first rotation transfer part 50 can be seen in FIG. 7B. The shape of the trough 61, which corresponds to and mates with the shape of the body 51 of the first rotation transfer part 50, can be seen in FIG. 7C. FIG. 7A shows the body 51 of the first rotation transfer part 50 when connected in the trough 61 of the power outtake element 20.

A first arm 63 extends outward from the main trough 61 of the receptacle 60. Further a second arm 65 extends outward from the main trough 61 of the receptacle 60. As shown the first arm 63 and the second arm 64 of the receptacle 60 extends out from the main trough 61 of the receptacle 60 on diametrically opposed positions of the main trough 61. The first arm 63 of the receptacle 60 is configured to receive the first arm 53 of the first rotation transfer part 50. The second arm 66 of the receptacle 60 is configured to receive the second arm 54 of the first rotation transfer part 50.

FIG. 7C also shows that the first and second arms 63, 64 of the receptacle has a width, second width W2.

In FIG. 7A is can be seen that the first width is slightly larger than the second width W2.

This evidently provides clearance in form of a gap between the first rotation transfer part 50 and the receptacle 60, i.e. a backlash is provided between the power outtake element and the first rotation transfer part 50.

In mechanical engineering, backlash, sometimes called lash or play, is a clearance or lost motion in a mechanism caused by gaps between parts.

Preferably, the first width (W1) is 1-2 mm smaller than the second width (W2).

Thus, a cross sectional shape (taken perpendicularly to the axial direction of the inner power outtake element 30) of the receptacle 60 corresponds to a cross sectional shape (taken perpendicularly to the axial direction of the first rotation transfer part 50) of the first rotation transfer part 50. The shapes are the same, but the receptacle 60 is slightly larger than the first rotation transfer part 50.

Thereby, when the power outtake element 20 is rotated by the electrical motor 150 as described above, the receptacle 60—being formed in the power outtake element 20, will rotate, and with a slight delay, the first rotation transfer part 50 will start to rotate, when the arms 63, 64 of the receptacle 60 will abut on the arms 53, 54 of the first rotation transfer part 50. This slight slack provided between the power outtake element 20 and the first rotation transfer part 50 by the size difference has the consequence that if the rotation of the power outtake element 20 is influenced by an uneven load, causing the power outtake element 20 to tilt slightly relative to the casing 10, then the tilt is not transferred to the first rotation transfer part 50, and thereby not to the first axle 70 and thereby not to the disc element 99. And, since a tilting of the power outtake element 20 does not cause a dislocation of the disc element 99, the interaction between the disc element 99 and the sensor device 399 is not influenced, and a more precise measurement of the rotational position of the power outtake element 20 may be obtained.

FIG. 4 shows an embodiment of the disclosure where the components of the motor unit 1 has been divided into subunits. In FIG. 4 the casing 10 is shown separated into three parts, the top part c11, the bottom part 12, and an end part 13.

The electrical motor 150, the disc element 99, and the gear mechanism 200, e.g. as described above have been enclosed in a drive subunit 100. The motor unit 1 may as shown further comprise a control unit 300 comprising at least a printed circuit board 310 on which the sensor device 399 is provided. The control unit 300 preferably further comprises control means, such as a processor for handling rotation data received from the sensor device 399. The control unit may further comprises control means, such as a processor for controlling the operation of the motor for example based at least partially from the rotation data received from the sensor device 399. The operation of the motor unit may further be supplied from an external device operated e.g. by a user. Control signals may be supplied wirelessly. In such cases the control subunit may comprise a wireless receiver. However, as shown in e.g. FIG. 4, the motor unit may further comprise a cord subunit 400. The cord subunit 400 comprises a set of cords 410 having a first end 411 connected to the control subunit 300 and a second end connected to an electrical connector plug 420. The electrical connector plug 420 allows connection to another device such as controller or an input panel or the like. The cord subunit may transfer data to and from the control subunit 300 of the motor unit 1.

Further, the cord subunit 400 may transfer electrical energy to and from a unit comprising a battery. However, in some embodiments, the motor unit 1 may alternatively or additionally comprise a battery for powering the electrical motor 150 and the control unit 300.

As also mentioned above, FIG. 5 shows the drive subunit 100 of the motor unit 1 of FIG. 4 in a detailed exploded view. The drive subunit 100 comprises a housing 101. The housing 101 is formed by a top part 110 and a bottom part 120. An opening 115 is provided in the top part 110 of the housing 101 of the drive subunit 100. Further a not shown opening is provided in the bottom part 120 of the housing 101 of the drive subunit 100, this opening being shaped and sized to allow the sensor device 399 to be located next to a bottom surface of the disc element 99.

The electrical motor 150, the gear mechanism 200 etc. is provided inside the housing 101 of the drive subunit 100. The top part and the bottom part 110, 120 may be assembled by the use of screws indicated by 130 in FIG. 5.

The casing 10, the housing 101, the gears, and the power outtake element 20 are preferably moulded in plastic in an injection moulding process.

It is to be noted that the figures and the above description have shown the example embodiments in a simple and schematic manner. Many of the specific mechanical details have not been shown since the person skilled in the art should be familiar with these details and they would just unnecessarily complicate this description. For example, the specific materials used and the specific injection moulding procedure have not been described in detail since it is maintained that the person skilled in the art would be able to find suitable materials and suitable processes to manufacture the container according to the current disclosure.

It will be appreciated by those of ordinary skill in the pertinent art that the functions of several elements can, in alternative embodiments, be carried out by fewer elements, or a single element. Similarly, in some embodiments, any functional element can perform fewer, or different, operations than those described with respect to the illustrated embodiment. Also, functional elements shown as distinct for purposes of illustration can be incorporated within other functional elements in a particular embodiment.

While the subject technology has been described with respect to various embodiments, those skilled in the art will readily appreciate that various changes and/or modifications can be made to the subject technology without departing from the scope of the present disclosure.

LIST OF PARTS 1 motor unit/modular construction system motor unit
10 casing/unit casing
11 top part of unit casing
12 bottom part of unit casing
13 end part of unit casing
15 opening through the casing (forming a bearing for the power outtake element)
20 power outtake element
30 inner power outtake element
31 top part of inner power outtake element
31' outer end of top part of inner power outtake element
31" inner end of top part of inner power outtake element
32 outer surface of top part of inner power outtake element
32' notch formed as indentation in the outer surface of the top part of inner power outtake element
33 inner space of top part of inner power outtake element
34 inner surface of top part of inner power outtake element 34' end surface of the inner space of top part of inner power outtake element
35 bottom part of inner power outtake element
36 outer surface of bottom part of inner power outtake element
37 inner space of bottom part of inner power outtake element
38 inwardly facing surface/inner surface of bottom part of inner power outtake element
39 end surface of the inner space of the bottom part of inner power outtake element
40 outer power outtake element
41 body of outer power outtake element
42 upper surface of the outer power outtake element
43 lower surface of the outer power outtake element
44 outer surface of the outer power outtake element
45 opening through the outer power outtake element
46 inner surface of the outer power outtake element
47 protrusion formed being elevated from the inner surface of the outer power outtake element
50 first rotation transfer part
51 body of the first rotation transfer part
52 outer surface of the body of the first rotation transfer part
53 first arm of the first rotation transfer part
54 second arm of the first rotation transfer part
55 inner space of the body of the first rotation transfer part
56 inwardly facing surface/inner surface of the first rotation transfer part
60 receptacle formed in the power outtake element
61 main trough of receptacle
62 inwardly facing surface of the main trough of the receptacle
63 first arm of receptacle
64 second arm of receptacle
70 first axle
71 first end of first axle
72 second end of first axle
80 second axle
81 first end of second axle
82 second end of second axle
90 disc element holder (magnet holder)
99 disc element (magnet)
100 drive subunit
101 housing of drive subunit
110 top part of housing of drive subunit
115 first opening through drive subunit housing formed in the top part of the drive subunit housing
116 inwardly facing surface of first opening through drive subunit housing
120' bottom part of housing of drive subunit
130 screws
150 Electric motor
151 motor output axle
200 gear mechanism
210 first gear (on motor output axle)
211 gear teeth formed in an outer surface of the first gear
220 second gear (on first axle)
221 large diameter part of second gear
222 gear teeth formed on large diameter part of second gear
223 small diameter part of second gear
224 gear teeth formed on small diameter part of second gear
225 through going opening through second gear
230 third gear (on second axle)
231 large diameter part of third gear
232 gear teeth formed on large diameter part of third gear
233 small diameter part of third gear
234 gear teeth formed on small diameter part of third gear
235 through going opening through third gear
240 fourth gear (on first axle)
241 large diameter part of fourth gear
242 gear teeth formed on large diameter part of fourth gear
243 small diameter part of fourth gear
244 gear teeth formed on small diameter part of fourth gear
245 through going opening through fourth gear
250 fifth gear (on second axle)
251 large diameter part of fifth gear
252 gear teeth formed on large diameter part of fifth gear
253 small diameter part of fifth gear
254 gear teeth formed on small diameter part of fifth gear
255 through going opening through fifth gear
260 sixth gear (on first axle)
261 lower part of sixth gear
262 gear teeth formed on lower part of sixth gear
263 upper part of sixth gear
264 outer surface of upper part of sixth gear
265 through going opening through sixth gear
280 outtake disc
281 lower part of outtake disc
282 profiled outer surface of lower part of outtake disc
283 upper part of outtake disc
284 outer surface of upper part of outtake disc
285 through going opening through outtake disc
300 control subunit
310 Printed circuit board
399 sensor
400 cord subunit
410 set of electrical cords
411 first end of the set of electrical cords
412 second end of the set of electrical cords
420 electrical connector plug
500 modular construction system
510 first type of construction elements
511 construction element of the first type of construction elements (brick)
512 construction element of first type of construction elements (plate)
520 second type of construction element
521 construction element of the second type of construction elements (double peg)
522 construction element of the second type of construction elements (beam)
523 construction element of the second type of construction elements (frame)
524 construction element (axle)
530 connector element for modular construction system
610 connector knob
620 knob receiving opening
630 cylindrical connector portion (resilient connector pegs)
631 circumferentially arranged bead arranged at the free end of the cylindrical connector portion
632 slit formed in the longitudinal direction of the cylindrical connector portion to provide resilience of the cylindrical connector portion
640 connector openings

What is claimed is:
1. A modular construction system motor unit for a modular construction system, the motor unit comprising
a casing;

an electrical motor mounted in the casing;
a power outtake element having at least one connector for connecting to a construction element, and being rotationally connected relative to said casing about a rotational axis;
a gearing mechanism provided between the electrical motor and the power outtake element; and
a rotation sensing mechanism configured for sensing the rotational position of the power outtake element relative to the casing,
wherein the rotation sensing mechanism comprises a disc element rotating with the power outtake element and a sensor device being fixed relative to the casing,
wherein the disc element is connected to the power outtake element or to a gear of the gear mechanism via a first rotation transfer part being fixedly connected to the disc element and a receptacle for receiving the first rotation transfer part, which receptacle is formed in the power outtake element or in said gear of the gear mechanism, and
wherein the receptacle and the first rotation transfer part have cooperating shapes and sizes configured to allow a backlash between the power outtake element the first rotation transfer part.

2. The modular construction system motor unit according to claim 1, wherein the cooperating shapes and sizes of the receptacle and the first rotation transfer part are configured such that the receptacle is allowed to rotate 0.5-2° before the first rotation transfer part is engaged for rotation with the outtake element.

3. The modular construction system motor unit according to claim 1, wherein the disc element is connected to the power outtake element via a first axle.

4. The modular construction system motor unit according to claim 3, wherein the disc element is arranged at a sidewall of the casing opposite to the power outtake element relative to the casing.

5. The modular construction system motor unit according to claim 3, wherein some of the gears of the gear mechanism are coaxially arranged surround by and supporting the first axle.

6. The modular construction system motor unit according to claim 1, wherein the first rotation transfer part comprises a cylindrical main body part and a first arm protruding therefrom, and where the receptacle comprises a cylindrical main trough and a first trough arm extending therefrom.

7. The modular construction system motor unit according to claim 6, wherein the first arm of the first rotation transfer part has a first width, and the first trough arm of the receptacle has a second width, wherein the first width is 1-2 mm smaller than the second width.

8. The modular construction system comprising a modular construction system motor unit according to claim 1, and a plurality of construction elements.

9. A modular construction system motor unit comprising:
a motor unit casing;
an electric motor disposed within the motor unit casing;
an outtake element extending from, and rotatable relative to, the motor unit casing, the outtake element affixed to a gear mechanism of the electrical motor such that when an output axel of the electric motor rotates, the outtake element is forced to rotate too, the outtake element or the gear mechanism defining a receptacle; and
a rotational sensing mechanism configured for sensing the rotational position of the outtake element relative to the motor unit case, the rotational sensing mechanism having a disc element connected to the outtake element or to a gear of the gear mechanism of the electrical motor via a rotation transfer part, such that the disc element and outtake element rotate proportionally,
wherein the rotation transfer part is configured for disposal in the receptacle, the receptacle and the rotation transfer part having cooperating shapes and sizes configured to allow a backlash between the power outtake element and the rotation transfer part.

10. The modular construction system motor unit according to claim 9, wherein the cooperating shapes and sizes of the receptacle and the rotation transfer part are configured such that the receptacle is allowed to rotate 0.5-2° before the first rotation transfer part is engaged for rotation with the outtake element.

11. The modular construction system motor unit according to claim 9, wherein the disc element is arranged at a sidewall of the casing opposite to the outtake element relative to the casing.

12. The modular construction system motor unit according to claim 9, wherein some of the gears of the gear mechanism are coaxially arranged surround by and supporting the first axle.

13. The modular construction system motor unit according to claim 9, wherein the rotation transfer part comprises a cylindrical main body part and an arm protruding therefrom, and where the receptacle comprises a cylindrical main trough and an trough arm extending therefrom.

14. The modular construction system motor unit according to claim 13, wherein the arm of the rotation transfer part has a first width, and the trough arm of the receptacle has a second width, wherein the first width is 1-2 mm smaller than the second width.

15. A modular construction system motor unit comprising:
a motor unit casing;
an electric motor disposed within the motor unit casing;
an outtake element extending from, and rotatable relative to, the motor unit casing, the outtake element affixed to a gear mechanism of the electrical motor such that when an output axel of the electric motor rotates, the outtake element is forced to rotate too; and
a rotational sensing mechanism configured for sensing the rotational position of the outtake element relative to the motor unit case, the rotational sensing mechanism having a disc element connected to the outtake element via a rotation transfer part such that the disc element and outtake element rotate proportionally;
wherein the rotation transfer part is configured for disposal in the receptacle to allow a backlash between the power outtake element and the rotation transfer part, the receptacle able to rotate 0.5-2° before the rotation transfer part is engaged for rotation with the outtake element.

* * * * *